US012499298B2

(12) United States Patent
Muehlenstaedt et al.

(10) Patent No.: US 12,499,298 B2
(45) Date of Patent: Dec. 16, 2025

(54) AUTOMATED GENERATION AND REFINEMENT OF VARIATION PARAMETERS FOR SIMULATION SCENARIOS

(71) Applicant: Volkswagen Group of America Investments, LLC, Reston, VA (US)

(72) Inventors: Thomas Muehlenstaedt, Bavaria (DE); Roman Nagy, Unterhaching (DE); Jost Poettner, Maisach (DE)

(73) Assignee: Volkswagen Group of America Investments, LLC, Reston, VA (US)

( * ) Notice: Subject to any disclaimer, the term of this patent is extended or adjusted under 35 U.S.C. 154(b) by 1012 days.

(21) Appl. No.: 17/647,623

(22) Filed: Jan. 11, 2022

(65) Prior Publication Data

US 2023/0222268 A1 Jul. 13, 2023

(51) Int. Cl.
*G06F 30/27* (2020.01)
*B60W 30/095* (2012.01)
(Continued)

(52) U.S. Cl.
CPC ............ *G06F 30/27* (2020.01); *G06F 18/214* (2023.01); *B60W 30/095* (2013.01);
(Continued)

(58) Field of Classification Search
None
See application file for complete search history.

(56) References Cited

U.S. PATENT DOCUMENTS 11,030,364 B2 6/2021 Sholingar et al.
11,086,318 B1 8/2021 Davis et al.
(Continued)

FOREIGN PATENT DOCUMENTS

CN 107122298 A 9/2017
CN 107992410 A 5/2018
(Continued)

OTHER PUBLICATIONS

Behavioral Pedestrian Tracking Using a Camera and Li DAR Sensors on a Moving Vehicle (Year: 2019).
(Continued)

*Primary Examiner* — Akash Saxena
(74) *Attorney, Agent, or Firm* — Fox Rothschild LLP

(57) ABSTRACT

Disclosed herein are system, method, and computer program product embodiments for generating and refining simulation scenarios. For example, the method includes generating multiple base scenarios, each including one or more constant and one or more variable parameters. For each of the base scenarios, the method includes generating scenario variations, each of which is associated with a unique combination of values assigned to its base scenario's parameters. The method further includes determining a system boundary in a parameter space defined by the variable parameters, wherein the system boundary divides the parameter space into a region including successful scenario variations and a region including unsuccessful scenario variations, and generating additional scenario variations within a threshold distance of the system boundary. The method further includes simulating operation of an autonomous vehicle (AV) using one or more generated scenario variations.

20 Claims, 14 Drawing Sheets

(51) Int. Cl.
*B60W 50/00* (2006.01)
*B60W 60/00* (2020.01)
*G06F 18/214* (2023.01)

(52) U.S. Cl.
CPC . *B60W 2050/0002* (2013.01); *B60W 60/0011* (2020.02); *B60W 60/0027* (2020.02)

(56) References Cited

U.S. PATENT DOCUMENTS 11,150,660 B1* 10/2021 Kabirzadeh ............. G06F 30/15
11,364,927 B2 6/2022 Wolff
11,734,157 B2* 8/2023 Sahu .................. G06F 11/3698 717/125
11,891,088 B1 2/2024 Kobilarov et al.
11,926,335 B1* 3/2024 Wang .................... B60W 50/06
12,060,060 B1 8/2024 Costantino et al.
2004/0006447 A1 1/2004 Gorin
2006/0123389 A1 6/2006 Kolawa et al.
2007/0136024 A1 6/2007 Moser et al.
2008/0065328 A1 3/2008 Eidehall et al.
2011/0178967 A1 7/2011 Delp
2012/0331439 A1 12/2012 Zimmermann et al.
2014/0035775 A1 2/2014 Zeng et al.
2016/0026915 A1 1/2016 Delp
2016/0059855 A1 3/2016 Rebhan et al.
2016/0101779 A1 4/2016 Katoh
2016/0257216 A1 9/2016 Al-Awami et al.
2017/0132334 A1 5/2017 Levinson et al.
2017/0206095 A1 7/2017 Gibbs et al.
2017/0329332 A1 11/2017 Pilarski et al.
2018/0046931 A1 2/2018 Bagherpour
2018/0259967 A1 9/2018 Frazzoli et al.
2019/0042679 A1 2/2019 Stefan et al.
2019/0129831 A1 5/2019 Goldberg
2019/0179738 A1* 6/2019 Hawthorne ............. G06F 30/20
2019/0317219 A1 10/2019 Smith et al.
2020/0074230 A1 3/2020 Englard et al.
2020/0189573 A1 6/2020 King et al.
2020/0192393 A1 6/2020 Aragon
2020/0249677 A1 8/2020 Maat et al.
2020/0250363 A1* 8/2020 Partridge ................ G06F 30/27
2020/0327313 A1 10/2020 Kedarisetti et al.
2020/0353943 A1 11/2020 Siddiqui et al.
2020/0356104 A1* 11/2020 Huai ..................... B60W 40/09
2020/0363800 A1 11/2020 Jojo-Verge et al.
2020/0377090 A1* 12/2020 Seccamonte ....... B60W 60/0011
2020/0409369 A1 12/2020 Zaytsev et al.
2021/0004647 A1* 1/2021 Amirloo Abolfathi ...................... G06F 18/217
2021/0049243 A1 2/2021 Venkatadri
2021/0094540 A1 4/2021 Bagschik et al.
2021/0096264 A1 4/2021 Bosse et al.
2021/0096571 A1 4/2021 Modalavalasa et al.
2021/0149404 A1 5/2021 Zeng et al.
2021/0157882 A1 5/2021 Liu et al.
2021/0165932 A1 6/2021 Mohan et al.
2021/0179124 A1 6/2021 Hollander et al.
2021/0237772 A1* 8/2021 Meltz ................ B60W 60/0015
2021/0300412 A1 9/2021 Dingli et al.
2021/0380142 A1* 12/2021 Ramamoorthy .. B60W 60/0013
2021/0403035 A1 12/2021 Danna et al.
2022/0011776 A1* 1/2022 Narang .............. B60W 60/0011
2022/0012388 A1 1/2022 Wyrwas et al.
2022/0019427 A1 1/2022 Davis et al.
2022/0035375 A1 2/2022 Rezaee et al.
2022/0063664 A1 3/2022 Liu
2022/0108049 A1 4/2022 Letwin et al.
2022/0153298 A1 5/2022 Wang et al.
2022/0156614 A1 5/2022 Dalli et al.
2022/0185323 A1* 6/2022 Dolben .............. B60W 60/0011
2022/0237410 A1 7/2022 Wrenninge
2022/0266859 A1 8/2022 Semple et al.
2023/0081687 A1* 3/2023 Yan ....................... B60W 40/06 701/36
2023/0205951 A1* 6/2023 Jiang ....................... G06F 30/27 703/1
2023/0289281 A1 9/2023 Redford et al.
2024/0101107 A1* 3/2024 Jafari Tafti ..... B60W 60/00276
2024/0166236 A1* 5/2024 Iyra ......................... G06F 30/20
2024/0370360 A1 11/2024 Chandler et al.
2024/0400103 A1* 12/2024 Van Heukelom ........................... B60W 30/0956
2024/0425066 A1* 12/2024 Wang .............. B60W 30/18163
2025/0123952 A1 4/2025 Whiteside et al.
2025/0217553 A1* 7/2025 Sadeghi .................. G06F 30/27

FOREIGN PATENT DOCUMENTS

DE 102019211009 A1 1/2021
WO 2019199880 A1 10/2019
WO 2021183748 A1 9/2021

OTHER PUBLICATIONS

International Search Report mailed in PCT/US2022/073251 on Sep. 22, 2022.

International Search Report mailed in PCT/US2022/073252 on Oct. 3, 2022.

International Search Report and Written Opinion dated May 15, 2023 for PCT/US2023/060394, 15 pages.

U.S. Appl. No. 17/647,620, filed Jan. 11, 2022.

International Search Report for PCT/US2023/023684 dated Sep. 19, 2023, 3 pages.

U.S. Appl. No. 17/387,922, filed Jul. 28, 2021, Method and System for Developing Autonomous Vehicle Training Simulations.

U.S. Appl. No. 17/387,927, filed Jul. 28, 2021, Method and System for Developing Autonomous Vehicle Training Simulations.

U.S. Appl. No. 17/468,600, filed Sep. 7, 2021, Method and System for Configuring Variations in Autonomous Vehicle Training Simulations.

Beck J.L. et al., "Rare-Event Simulation", (2017) In: Ghanem R., Higdon D., Owhadi H. (eds) Handbook of Uncertainty Quantification. Springer, Cham. https://doi.org/10.1007/978-3-319-12385-1_24.

Li, W. et al., "AADS: Augmented autonomous driving simulation using data-driven algorithms", (Mar. 27, 2019) Science Robotics, 4(28), eaaw0863.

Yurtsever, E. et al., A Survey of Autonomous Driving: Common Practics and Emerging Technologies, IEEE Access, vol. 8, Mar. 22, 2020.

Gonzalez, D. et al., A Review of Motion Planning Techniques for Automated Vehicles, IEEE Transactions on Intelligent Transportation Systems, vol. 17, No. 4, Apr. 2016, 1135-1145.

Riedmaier et al., Model Validation and Scenario Selection for Virtual-Based Homologation of Automated Vehicles, Applied Sciences, 11(35): 24 pages, Dec. 23, 2020.

Fremont et al., Formal Scenario-Based Testing of Autonomous Vehicles: From Simulation to the Real World, 2020.

* cited by examiner

AUTOMATED GENERATION AND REFINEMENT OF VARIATION PARAMETERS FOR SIMULATION SCENARIOS

BACKGROUND

Many vehicles today, including but not limited to autonomous vehicles (AVs), use motion planning systems to decide, or help the driver make decisions about, where and how to move in an environment. Motion planning systems rely on artificial intelligence models to analyze moving actors that the vehicle sensors may perceive, make predictions about future actions of the actors, and select or recommend a course of action for the vehicle that takes the actor's likely action into account.

To make predictions and determine courses of action, the vehicle's software stack (e.g., including motion planning models, perception models, etc.) must be tested and trained on data that the vehicle may encounter in an environment. The more unique scenarios that are used to train a vehicle's software stack, the better the stack can be at making decisions. However, the range of possible scenarios that a vehicle may encounter is limitless. Manual development of a large number unique simulation scenarios would require a significant investment in time and manpower, as well as a continued cost to update individual scenarios as the motion planning model improves and vehicle behavior changes.

While systems are available to randomly develop simulation scenarios, the number of possible random scenarios is also limitless. Purely random simulation would require the motion planning model to consider an extremely large number of scenarios that may not be relevant, or which at least would be extremely unlikely, in the real world. This causes a significant waste of computing resources and time. In addition, it can require the vehicle to be trained on a large number of less relevant scenarios well before the random process yields more relevant scenarios.

Therefore, methods of identifying and developing an effective set of relevant simulation scenarios and training the vehicle's model on such scenarios is needed. This document describes methods and systems that address issues such as those discussed above, and/or other issues.

SUMMARY

In a first set of embodiments, a simulation method is disclosed. The method may be embodied in computer programming instructions and/or implemented by a system that includes a processor. The method includes generating multiple base scenarios, each of the base scenarios including one or more constant parameters and one or more variable parameters. For each of the base scenarios, the method includes generating multiple scenario variations, wherein each of the scenario variations is associated with a unique combination of values assigned to that base scenario's one or more variable parameters. The method further includes determining a system boundary in a parameter space defined by that base scenario's one or more variable parameters, wherein the system boundary divides the parameter space into a first region including successful scenario variations and a second region including unsuccessful scenario variations and generating additional scenario variations within a threshold distance of the system boundary. The method further includes simulating operation of an autonomous vehicle (AV) using multiple scenarios, the scenarios including a subset of the base scenarios and one or more generated scenario variations.

Implementations of the disclosure may include one or more of the following optional features. In some examples, the method includes generating a global system boundary in a design space defined by multiple base scenario parameters, wherein the global system boundary divides the design space into a first region including base scenarios having more than a threshold number of successful scenario variations and a second region including base scenarios having fewer than a threshold number of successful scenario variations. The method may include generating additional base scenarios within a threshold distance of the global system boundary. The method may include prioritizing the base scenarios and the additional base scenarios based on a distance of each of the plurality of base scenarios and each of the additional base scenarios from the global system boundary. In some examples, the method includes, for each of the base scenarios, prioritizing the scenario variations for that base scenario and the additional scenario variations based on a distance of each of the plurality of scenario variations and each of the additional scenario variations from the system boundary. Simulating the operation of the AV using the scenarios may include selecting, based on the prioritizing of the base scenarios and the prioritizing of the scenario variations, the subset of the base scenarios and a subset of scenario variations associated with each of the base scenarios. The method may include removing a first base scenario as redundant when the first base scenario is determined to be within a threshold distance of a second base scenario in the design space, the threshold being determined based on a distance from the global system boundary.

In some examples, generating the base scenarios includes generating base scenarios to include parameters that are uniformly sampled from the design space. The method may further include removing a first scenario variation as redundant when the first scenario variation is determined to be within a threshold distance of a second scenario variation in the parameter space, the threshold being determined based on a distance from the system boundary. The method may include storing each base scenario and corresponding scenario variations as a scenario data object in a data store. In some examples, the method includes detecting a triggering event indictive of whether or not new scenarios need to be generated, the triggering event selected from at least one of the following: detection of change in a system boundary that is greater than a threshold, detection of change in a global system boundary that is greater than a threshold, a threshold amount of time since a previous scenario generation, receipt of a user instruction, initiation of a scenario refresh cycle, or an AV system change that requires new scenario generation.

In other embodiments, a vehicle motion planning model training system includes a processor, a data store containing simulation scenarios, and a memory that stores programming instructions that are configured to cause the processor to train a vehicle motion planning model by generating multiple base scenarios, each of the base scenarios including one or more constant parameters and one or more variable parameters. For each of the base scenarios, the programming instructions are configured to cause the processor to train a vehicle motion planning model by generating multiple scenario variations, wherein each of the scenario variations is associated with a unique combination of values assigned to that base scenario's one or more variable parameters. For each of the base scenarios, the programming instructions are configured to cause the processor to train a vehicle motion planning model by determining a system boundary in a parameter space defined by that base scenario's one or more variable parameters, wherein the system boundary divides the parameter space into a first region including successful scenario variations and a second region including unsuccessful scenario variations and generating additional scenario variations within a threshold distance of the system boundary. For each of the base scenarios, the programming instructions are configured to cause the processor to train a vehicle motion planning model by simulating operation of an autonomous vehicle (AV) using multiple scenarios, the scenarios including a subset of the base scenarios and one or more generated scenario variations.

Implementations of the disclosure may include one or more of the following optional features. In some examples, the programming instructions are further configured to cause the processor to train the vehicle motion planning model by generating a global system boundary in a design space defined by multiple base scenario parameters, wherein the global system boundary divides the design space into a first region including base scenarios having more than a threshold number of successful scenario variations and a second region including base scenarios having fewer than a threshold number of successful scenario variations. The programming instructions may be further configured to cause the processor to train the vehicle motion planning model by generating additional base scenarios within a threshold distance of the global system boundary. The programming instructions may be further configured to cause the processor to train the vehicle motion planning model by prioritizing the base scenarios and the additional base scenarios based on a distance of each of the plurality of base scenarios and each of the additional base scenarios from the global system boundary.

In other embodiments, a computer program product is disclosed. The product includes a memory that stores programming instructions that are configured to cause a processor to train a vehicle motion planning model by generating multiple base scenarios, each of the base scenarios comprising one or more constant parameters and one or more variable parameters. For each of the base scenarios, the programming instructions are further configured to cause the processor to train the vehicle motion planning model by generating multiple scenario variations, wherein each of the scenario variations is associated with a unique combination of values assigned to that base scenario's one or more variable parameters. The programming instructions are further configured to cause the processor to train the vehicle motion planning model by determining a system boundary in a parameter space defined by that base scenario's one or more variable parameters, wherein the system boundary divides the parameter space into a first region including successful scenario variations and a second region including unsuccessful scenario variations and generating additional scenario variations within a threshold distance of the system boundary. The programming instructions are further configured to cause the processor to train the vehicle motion planning model by determining a system boundary in a parameter space defined by simulating operation of an autonomous vehicle (AV) using multiple scenarios, the scenarios comprising a subset of the base scenarios and one or more generated scenario variations.

Implementations of the disclosure may include one or more of the following optional features. In some examples, the programming instructions are further configured to cause the processor to train the vehicle motion planning model by generating a global system boundary in a design space defined by multiple base scenario parameters, wherein the global system boundary divides the design space into a first region including base scenarios having more than a threshold number of successful scenario variations and a second region including base scenarios having fewer than a threshold number of successful scenario variations. The programming instructions may be further configured to cause the processor to train the vehicle motion planning model by generating additional base scenarios within a threshold distance of the global system boundary. The programming instructions may be further configured to cause the processor to train the vehicle motion planning model by prioritizing the base scenarios and the additional base scenarios based on a distance of each of the plurality of base scenarios and each of the additional base scenarios from the global system boundary. The programming instructions may be further configured to cause the processor to train the vehicle motion planning model by, for each of the base scenarios, prioritizing the scenario variations for that base scenario and the additional scenario variations based on a distance of each of the plurality of scenario variations and each of the additional scenarios variation from the system boundary.

In other embodiments, a method for prioritizing scenarios for a simulation is disclosed. The method may be embodied in computer programming instructions and/or implemented by a system that includes a processor. The method includes generating a base scenario including one or more constant parameters and one or more variable parameters. The method further includes generating multiple scenario variations, wherein each of the scenario variations is associated with a unique combination of values assigned to the one or more variable parameters. The method further includes executing at least some of the scenario variations to determine multiple scenario outcomes and generating, using scenario variations and the scenario outcomes, a model for predicting an outcome of a scenario variation of the base scenario, the predicted outcome associated with an uncertainty score. The method further includes assigning, to each of the scenario variations, a priority based on an uncertainty score associated with a predicted outcome for that scenario variation, wherein a first scenario variation is assigned a higher priority over a second scenario variation when the first scenario variation's uncertainty score is greater than the second scenario variation's uncertainty score.

Implementations of the disclosure may include one or more of the following optional features. In some examples, the method further includes simulating operation of an autonomous vehicle (AV) using the base scenario and at least the highest priority scenario variation. The method may further include determining a system boundary for the base scenario in a parameter space defined by the one or more variable parameters, wherein the system boundary divides the parameter space into a first region including one or more scenario variations associated with a successful predicted outcome and a second region including one or more scenario variations associated with an unsuccessful predicted outcome. The method may further include reprioritizing the scenario variations upon detection of a change in the system boundary. In some examples, the method include identifying one or clusters of unsuccessful scenario variations, each of the one or more clusters associated with a unique failure mode of a simulation and reprioritizing the scenario variations based on the identified one or more clusters.

The model may be a machine learning model. The method may include using higher priority scenario variations more often than lower priority scenario variations during simulations for training or testing an autonomous vehicle (AV). The method may include assigning a triage ranking to each of the scenario variations based on the assigned priority. The method may further include classifying the scenario variation as successful in response to a test vehicle completing the planned trajectory within a threshold period of time in a simulation using the base scenario. The method may further include identifying anomalous autonomous vehicle (AV) behavior when an outcome of a scenario variation predicted by the model differs from an actual outcome of the scenario variation when executed by more than a threshold.

In other embodiments, a vehicle motion planning model training system is disclosed. The system includes a processor, a data store containing simulation scenarios, and a memory that stores programming instructions that are configured to cause the processor to train a vehicle motion planning model by generating a base scenario including one or more constant parameters and one or more variable parameters. The programming instructions are configured to cause the processor to train a vehicle motion planning model by generating multiple scenario variations, wherein each of the scenario variations is associated with a unique combination of values assigned to the one or more variable parameters. The programming instructions are configured to cause the processor to train a vehicle motion planning model by executing at least some of the scenario variations to determine scenario outcomes. The programming instructions are configured to cause the processor to train a vehicle motion planning model by generating, using the at least some of the scenario variations and the scenario outcomes, a model for predicting an outcome of a scenario variation of the base scenario, the predicted outcome associated with an uncertainty score. The programming instructions are configured to cause the processor to train the vehicle motion planning model by assigning, to each of the scenario variations, a priority based on an uncertainty score associated with a predicted outcome for that scenario variation, wherein a first scenario variation is assigned a higher priority over a second scenario variation when the first scenario variation's uncertainty score is greater than the second scenario variation's uncertainty score.

Implementations of the disclosure may include one or more of the following optional features. In some examples, the programming instructions are further configured to cause the processor to train the vehicle motion planning model by simulating operation of an autonomous vehicle (AV) using the base scenario and at least the highest priority scenario variation. The programming instructions may be further configured to cause the processor to train the vehicle motion planning model by determining a system boundary for the base scenario in a parameter space defined by the one or more variable parameters, wherein the system boundary divides the parameter space into a first region including one or more scenario variations associated with a successful predicted outcome and a second region including one or more scenario variations associated with an unsuccessful predicted outcome. The programming instructions may be further configured to cause the processor to train the vehicle motion planning model by reprioritizing the scenario variations upon detection of a change in the system boundary. The programming instructions may be further configured to cause the processor to train the vehicle motion planning model by identifying one or clusters of unsuccessful scenario variations, each of the one or more clusters associated with a unique failure mode of a simulation and reprioritizing the scenario variations based on the identified one or more clusters.

The model may be a machine learning model. The programming instructions may be further configured to cause the processor to train the vehicle motion planning model by using higher priority scenario variations more often than lower priority scenario variations during simulations for training or testing an autonomous vehicle (AV). The programming instructions may be further configured to cause the processor to train the vehicle motion planning model by assigning a triage ranking to each of the scenario variations based on the assigned priority. In some examples, the programming instructions are further configured to cause the processor to train the vehicle motion planning model by classifying the scenario variation as successful in response to a test vehicle completing the planned trajectory within a threshold period of time in a simulation using the base scenario. The programming instructions may be further configured to cause the processor to train the vehicle motion planning model by identifying anomalous autonomous vehicle (AV) behavior when an outcome of a scenario variation predicted by the model differs from an actual outcome of the scenario variation when executed by more than a threshold.

In other embodiments, a computer program product is disclosed. The product includes a memory that stores programming instructions that are configured to cause a processor to train a vehicle motion planning model by generating a base scenario comprising one or more constant parameters and one or more variable parameters. The programming instructions are configured to cause the processor to train a vehicle motion planning model by generating multiple scenario variations, wherein each of the scenario variations is associated with a unique combination of values assigned to the one or more variable parameters. The programming instructions are configured to cause the processor to train a vehicle motion planning model by executing at least some of the scenario variations to determine scenario outcomes. The programming instructions are configured to cause the processor to train a vehicle motion planning model by generating, using the at least some of the scenario variations and the scenario outcomes, a model for predicting an outcome of a scenario variation of the base scenario, the predicted outcome associated with an uncertainty score. The programming instructions are configured to cause the processor to train the vehicle motion planning model by assigning, to each of the scenario variations, a priority based on an uncertainty score associated with a predicted outcome for that scenario variation, wherein a first scenario variation is assigned a higher priority over a second scenario variation when the first scenario variation's uncertainty score is greater than the second scenario variation's uncertainty score.

Implementations of the disclosure may include one or more of the following optional features. In some examples, the programming instructions are further configured to cause the processor to train the vehicle motion planning model by simulating operation of an autonomous vehicle (AV) using the base scenario and at least the highest priority scenario variation. The programming instructions may be further configured to cause the processor to train the vehicle motion planning model by determining a system boundary for the base scenario in a parameter space defined by the one or more variable parameters, wherein the system boundary divides the parameter space into a first region including one or more scenario variations associated with a successful predicted outcome and a second region including one or more scenario variations associated with an unsuccessful predicted outcome. The programming instructions may be further configured to cause the processor to train the vehicle motion planning model by reprioritizing the scenario variations upon detection of a change in the system boundary. The programming instructions may be further configured to cause the processor to train the vehicle motion planning model by identifying one or clusters of unsuccessful scenario variations, each of the one or more clusters associated with a unique failure mode of a simulation and reprioritizing the scenario variations based on the identified one or more clusters.

The model may be a machine learning model. The programming instructions may be further configured to cause the processor to train the vehicle motion planning model by using higher priority scenario variations more often than lower priority scenario variations during simulations for training or testing an autonomous vehicle (AV). The programming instructions may be further configured to cause the processor to train the vehicle motion planning model by assigning a triage ranking to each of the scenario variations based on the assigned priority. In some examples, the programming instructions are further configured to cause the processor to train the vehicle motion planning model by classifying the scenario variation as successful in response to a test vehicle completing the planned trajectory within a threshold period of time in a simulation using the base scenario. The programming instructions may be further configured to cause the processor to train the vehicle motion planning model by identifying anomalous autonomous vehicle (AV) behavior when an outcome of a scenario variation predicted by the model differs from an actual outcome of the scenario variation when executed by more than a threshold.

BRIEF DESCRIPTION OF THE DRAWINGS

The accompanying drawings are incorporated herein and form a part of the specification.

FIG. 1A illustrates example elements of a vehicle simulation scenario, while FIG. 1B illustrates a modified version of the simulation scenario of FIG. 1A.

DETAILED DESCRIPTION

Figures 1A, 1B:
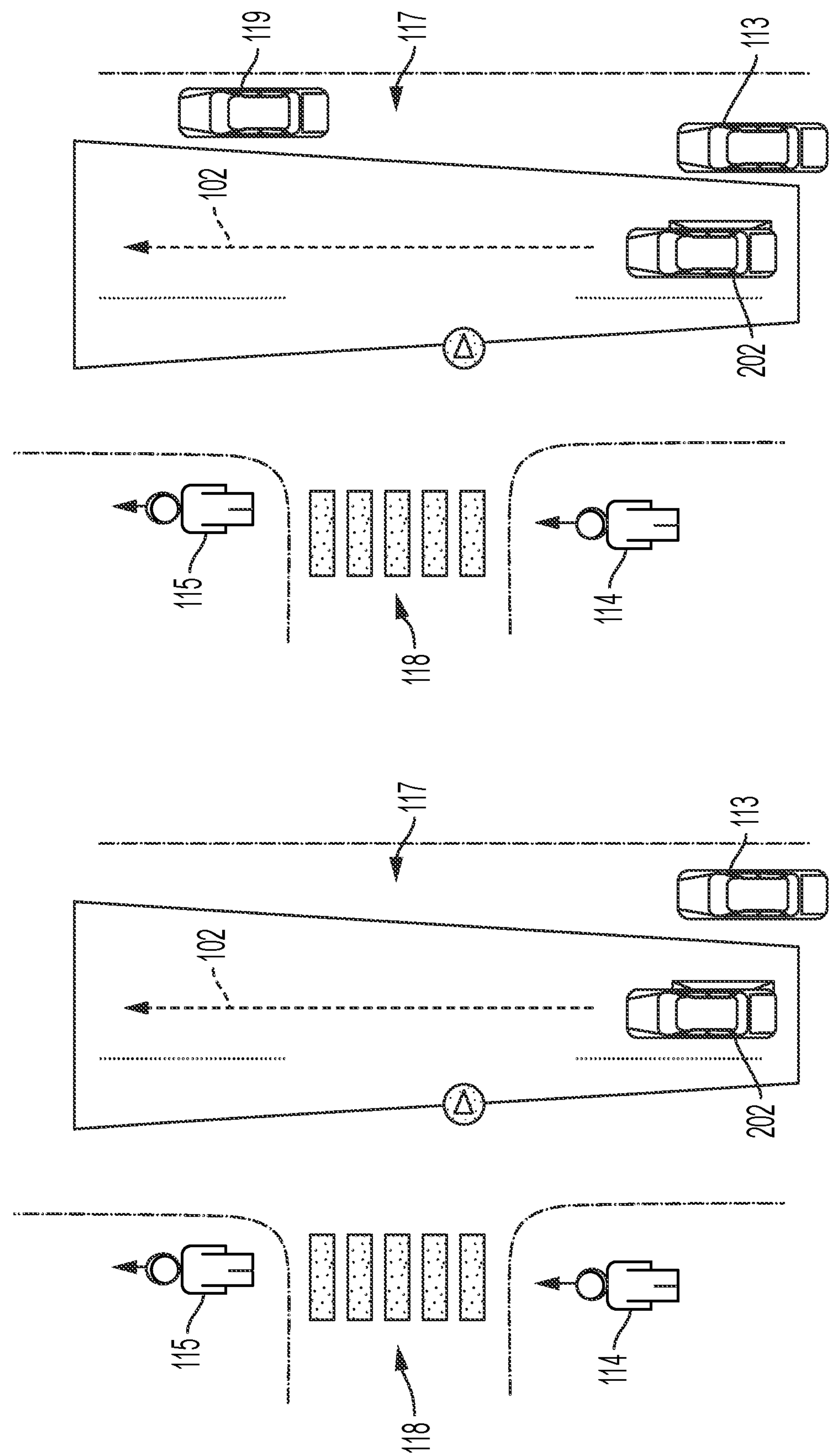

Provided herein are system, apparatus, device, method and/or computer program product embodiments, and/or combinations and sub-combinations thereof, for automated generation and refinement of variation parameters for simulation scenarios.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." Definitions for additional terms that are relevant to this document are included at the end of this Detailed Description.

Simulations are an integral part of allowing AVs to operate effectively. Simulations provide a mechanism for testing and validating different behaviors of AVs in a variety of different conditions and environments. For example, a simulation application includes code and routines that is operable, when executed by the processor, to generate a software-based environment (one or more "scenarios") in which effects of the behaviors can be virtualized and evaluated before the behaviors are implemented in a real-world environment. The simulations can include virtual objects and conditions that mimic the real-world environment as well as a virtual vehicle (built based on the hardware model and software model for the virtual vehicle, which are collectively referred to as a "simulated vehicle"), a real vehicle and/or a vehicle model. For example, the scenarios can include virtual (and/or augmented) roads, parking lots, sidewalks, curbs, steps, road markings, traffic lights, traffic signs, cones, construction markers, buildings, trees, bushes, lawns, steps, fences, and other infrastructure elements; simulated vehicles, cyclists, pedestrians, animals, and other actors; simulated rain, wind, fog, sleet, snow, hail, dust, bugs, leaves, exhaust from other vehicles, water from sprinklers, and other weather and environmental elements; and/or simulated garbage bins, trash, and other objects. These features may be included in a scenario, for example, based on logged data from one or more real-world AVs. In addition, or in the alternative, at least certain of the features may be fabricated for a scenario without reference to logged data. It should be noted that scenarios and simulations can include virtual environments, real-world environments, and/or mixed reality environments (i.e., augmented environments).

The driving of a test vehicle in a simulation (i.e., execution of a simulation) is virtual. Furthermore, different simulation modes are possible, in which hardware is involved to different degrees. In the case of complete simulation, the term "software in the loop" or "model in the loop" is used. This involves everything being simulated including a simulated test vehicle in a simulated environment, the travel of the simulated test vehicle through the simulated environment, and the detection of its surroundings by at least one sensor (simulated). The term "hardware in the loop" is used when, for example, the actual controller and/or an actual sensor of a test vehicle is used as hardware during testing. Finally, the term "vehicle in the loop" is used when a test vehicle is actually driven. In general, actual driving of the test vehicle then takes place on a dedicated test environment, possibly cordoned-off from the general public, such as on a decommissioned airfield. The test environment may include other stationary or moving objects. The sensors of the test vehicle perceive the other objects and use perception data for planning and executing movement of the test vehicle. In some cases, the sensors of the test vehicle may also be supplied with simulated signals representing simulated aspects of the scene. It is thus possible for the test vehicle to be driven through the simulated scenario by a real driver (vehicle in the loop) or by a simulated driver (software/model/hardware in the loop). In the case of a simulated driver, the test vehicle is driven through the simulated scenario completely in simulation. It is also possible to have a real test vehicle driven on a cordoned-off area, namely by means of a real driver, with the sensors of the sensor system of the test vehicle then being supplied with simulated signals. Furthermore, it is also possible to have a simulated vehicle driven by a real driver in a hardware/model/software in the loop simulation, for example in a driving simulator with a reconstructed driver's cab comprising for example a steering wheel, pedals, a gearshift and further control elements of a real vehicle.

This disclosure describes systems, methods, and apparatuses for generating simulations using one or more simulation scenarios (or "scenarios"). In at least some examples, such simulations can be used to test and/or train a stack of an AV. For example, simulations can be used to validate or train software (e.g., an AV stack that utilizes one or more machine learning algorithms, or other software algorithms) executed on AVs to ensure that the software is able to effectively control such AVs. In additional or alternative examples, simulations can be used to learn about the constraints of AVs that use the AV stack. For instance, simulations can be used to understand the operational space of an AV (e.g., an envelope of parameters in which the autonomous AV stack effectively controls the AV) in view of surface conditions, ambient noise, faulty components, etc. Simulations can also be useful for generating feedback for improving operations and designs of AVs. For instance, simulations can be useful for determining an amount of redundancy that is required in an autonomous AV stack, or how to modify a behavior of the autonomous AV stack based on what is learned through simulations. Furthermore, in additional and alternative examples, simulations can be useful to inform the hardware design of AVs, such as optimizing placement of sensors on an AV.

An AV software stack includes various software platforms which handle various tasks that help the AV move throughout an environment. These tasks include tasks such as perception, motion planning, and motion control. An AV stack may reside in a software repository (in the physical form of computer-readable memory) that is available to a vehicle's original equipment manufacturer (OEM) and/or to an OEM's suppliers. An AV stack also may be directly deployed on a vehicle. To be effective, before it is deployed on a vehicle an AV stack must be trained and tested. However, in most cases, it is either not feasible and/or is dangerous to train and/or test the AV stack in real world driving environments. Instead, the training and testing relies on simulations. When an AV stack is executed in a simulation scenario (using software, hardware, and/or vehicle in the loop models), it can process the simulation scenario and generate a response, which may be used as feedback for training or testing of the AV stack. Supplemental training also may be done after an AV stack is deployed on a vehicle, with additional simulation scenarios that will continue to improve the AV stack's operation and help the AV recognize and react to an increased variety of conditions when it encounters them in the real world.

For instance, simulations may be used to determine whether a particular type of event or interaction with another agent has occurred, such as a particular type of behavior, collision, or near collision. As an example, these events and interactions may be used for various purposes, such as determining whether the AV stack can "pass" a given simulation without a collision or near collision and to pinpoint the types of behaviors and/or AV stack modules that may need attention in order to improve performance without requiring a vehicle to physically drive "real" miles or having to "manufacture" situations in the real world. The methods and systems of this disclosure may provide for an effective and realistic way of training and/or testing the AV stack of AVs in order to identify potential critical bugs with the software for outlier situations. For readability, this disclosure may use the simpler terms "training" or "testing" rather than phrase "training and/or testing" to describe methods, systems, and components and subcomponents of methods and systems. However, methods and systems described using these simpler terms should be understood to encompass training and/or testing systems and methods and to include training and/or testing components and subcomponents.

When creating a simulation scenario to perform testing, validation, and/or training, it is possible to specifically instantiate the environment with various and specific examples. For example, given a specific simulation scenario, the scenario can be parametrized in many different ways, e.g., by the actor attributes like speed, size, heading and potentially more complex parameters, AV parameters like the AV speed, and scene parameters like street properties and locations of different actors in the scene. Each instantiation of such a simulation scenario can be unique and defined. Enumerating all possible scenarios manually can require inordinate (or nearly infinite) amounts of time and is typically not possible given the numerical nature of the many parameters. And, if not every possible scenario is constructed, various scenarios can go untested because for a single simulation scenario the amount of parameters can be high. As a result, the number of possible scenario parameter combinations leads to a large set of simulation variations. And, to execute all the scenario variations on a regular basis can become expensive. Moreover, it can become computationally expensive and inefficient to triage all failing scenario variations after each test run, especially due to scenario variation combinations of parameters operating beyond the system boundaries. Human triage (e.g., of simulation results) has limited capacity for triaging and the challenge is to choose proper scenario variations to be triaged.

At the same time, even when multiple simulation scenarios are described, there is no guarantee that the additional simulation scenarios can provide any additional, useful, information for testing the AV stack. For example, incremental differences in stop positions of a simulated AV before a cross-walk can only provide marginal, if any, additional useful information about the ability of an AV to appropriately stop for pedestrians in the cross-walk simulation scenario (without any additional changes to the simulation scenario), and may not be useful in training and/or improving the AV stack. On the other hand, including an object that impedes the AV's view of cross-walk signal/pedestrian in the cross-walk simulation scenario can provide more useful information about the AV's ability to maneuver the crosswalk. Therefore, it is important to select or create simulation scenarios that not only cover a multitude of unique environmental situations that an AV may encounter but to do so in a manner that avoids redundancy and provides useful information for training and/or testing the AV stack. The systems and methods of this disclosure achieve these objectives in an automated manner and use a feedback-driven approach to improve the simulation scenario selection process over time.

"Simulation" is the process of evaluating a system (e.g., an AV system) by executing one or more scenarios. A simulation scenario or scenarios is an artificial representation of a real-world occurrence created by defining a set of parameters and/or programming instructions that identify scene parameters, object parameters, and AV parameters including, for example, the initial locations, dimensions, and other configuration parameters for the scene, the AV and/or one or more objects or actors (collectively "objects") the AV may encounter in the scenario, timeline of significant events and the related environmental conditions in the scenario, or the like. The simulation scenario definition may further include acceleration profiles, speed profiles, movement triggers, other profiles, or other metadata that guide the AV's or one or more object's possible movements in the scenario as a function of time and/or changes in the scene parameters over time. Some objects may be actors that are moving, or which could move, such as vehicles, pedestrians or animals. Other objects also may be static objects that can occlude the field of view of the AV's perception system, such as vegetation or buildings. FIG. 1A is a graphic illustration of an example simulation scenario for a vehicle 202 (FIG. 2) that is moving along a first street 117 according to a planned trajectory 102 past an intersection with a second street 118. The simulation scenario definition includes actors that are a parked vehicle 113 and pedestrians 114 and 115. The configuration for parked vehicle 113 may define that the vehicle is not currently moving, but that it could start to move forward and/or into the vehicle's lane (e.g., the configuration for pedestrian 114 may define that the pedestrian is moving parallel to first street 117 and toward second street 118, and that it is equally likely to cross either the first street 117 or the second street 118 when it reaches the intersection). The configuration for pedestrian 115 may define that the pedestrian is moving parallel to first street 117, and that it has a higher probability of continuing to move forward than it is to turn and cross the first street 117. The simulation scenario of FIG. 1A may be stored in a training system database for use in training one or more subsystems of an AV stack.

Figure 2:
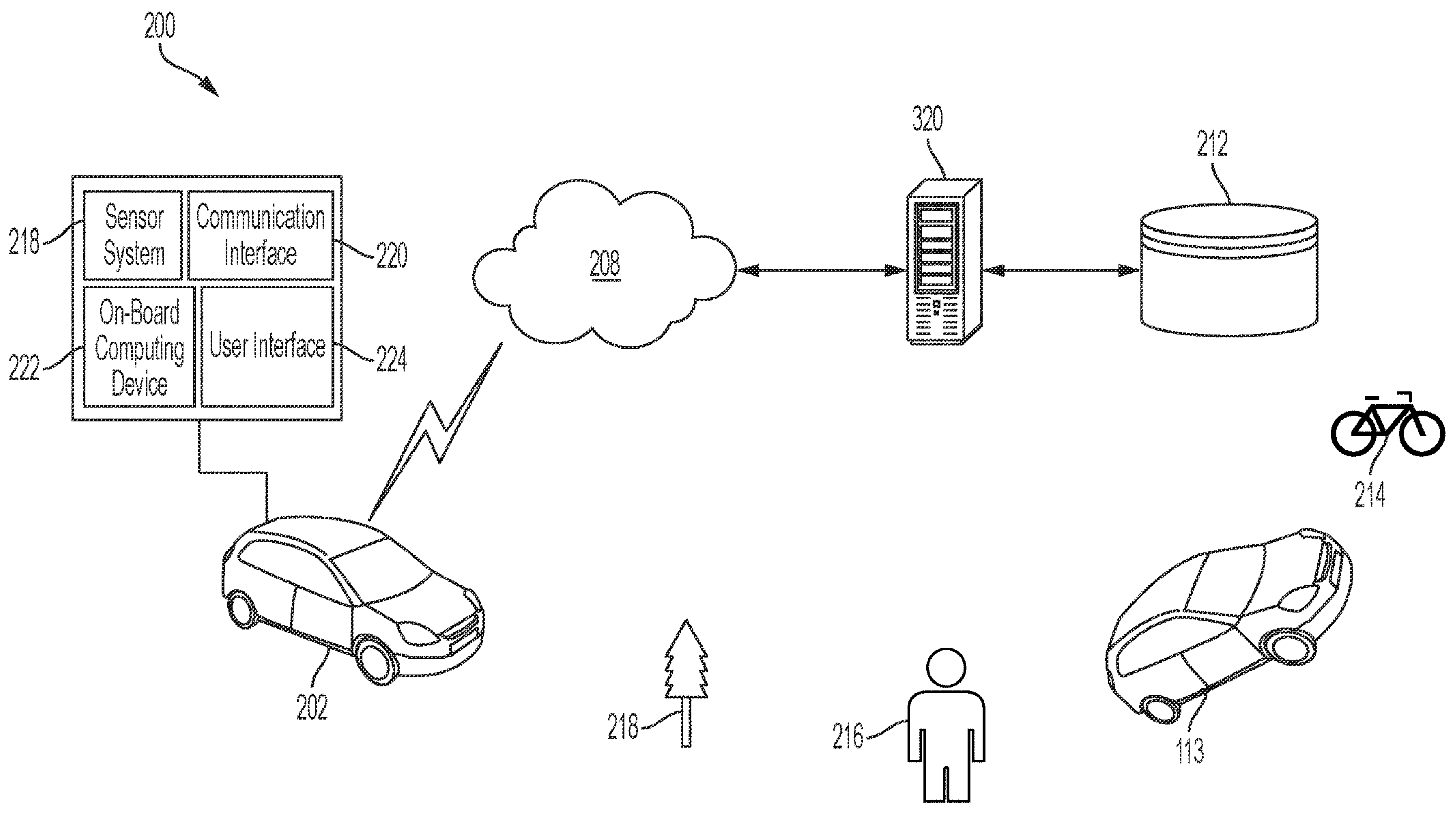
FIG. 2 illustrates an example AV system, in accordance with aspects of the disclosure.

Before further exploring the details of the present embodiments, we provide some background information about AV systems. FIG. 2 illustrates an exemplary AV system 200, in accordance with aspects of the disclosure. System 200 comprises a vehicle 202 that is traveling along a road in a semi-autonomous or autonomous manner. Vehicle 202 is also referred to herein as AV 202. AV 202 can include, but is not limited to, a land vehicle (as shown in FIGS. 1A and 1B), an aircraft, or a watercraft.

AV 202 is generally configured to detect objects 113, 214, 216 in proximity thereto. The objects can include, but are not limited to, a vehicle 113, cyclist 214 (such as a rider of a bicycle, electric scooter, motorcycle, or the like) and/or a pedestrian 216, and/or stationary objects 218, such as a building, or a tree or other vegetation. This object detection can be made, for example, by analyzing sensor data generated by at least one sensor device on the AV 202. When such a detection is made, the AV 202 performs operations to: generate one or more possible object trajectories for the detected object; determine one or more dynamic state classifications, goals and/or future intentions for the detection object; and use at least one of the generated possible object trajectories, dynamic state classifications, goals and future intentions to facilitate a determination of a vehicle trajectory 102. The AV 202 may then perform operations to follow the vehicle trajectory 102.

In some scenarios, the AV 202 performs additional operations to determine a probability that a conflict will occur between the AV 202 and the object in a threshold period of time (e.g., 1 minute). The conflict may be a physical contact, a condition where the AV 202 comes within less than a threshold distance from the object, or a condition that will cause the AV 202 to react with greater than a threshold deceleration or angular displacement in a period of time. If the probability exceeds a threshold level and/or satisfies one or more other conditions, the AV 202 performs operations to determine whether the contact can be avoided if the vehicle trajectory 102 is followed by the AV 202 and any one of a plurality of dynamically generated maneuvers is performed in a pre-defined time period (e.g., N milliseconds). If the conflict can be avoided, then the AV 202 takes no action or optionally performs a first type of maneuver (e.g., mildly slows down). In contrast, if the conflict cannot be avoided, then the AV 202 immediately takes a second type of maneuver (e.g., more forcefully applies the AV's brakes and/or changes the AV's direction of travel). In some cases, the conflict impedes or prevents the AV 202 from continuing on the trajectory 102. The AV 202 may slow or stop and/or be unable to continue to make progress along the trajectory 102.

As illustrated in FIG. 2, the AV 202 may include a sensor system 218, an on-board computing device 222, a communications interface 220, and a user interface 224. AV 202 may further include certain components (as illustrated, for example, in FIG. 2) included in vehicles, which may be controlled by the on-board computing device 320 using a variety of communication signals and/or commands, such as, for example, acceleration signals or commands, deceleration signals or commands, steering signals or commands, braking signals or commands, etc.

The sensor system 218 may include one or more sensors that are coupled to and/or are included within the AV 202, as illustrated in FIG. 2. For example, such sensors may include, without limitation, a LiDAR system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the AV 202, information about the environment itself, information about the motion of the AV 202, information about a route of the vehicle, or the like. As AV 202 travels over a surface, at least some of the sensors may collect data pertaining to the surface.

Network 208 may include one or more wired or wireless networks. For example, the network 208 may include a cellular network (e.g., a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

AV 202 may retrieve, receive, display, and edit information generated from a local application or delivered via network 208 from database 212. Database 212 may be configured to store and supply raw data, indexed data, structured data, map data, program instructions or other configurations as is known.

The communications interface 220 may be configured to allow communication between AV 202 and external systems, such as, for example, external devices, sensors, other vehicles, remote servers (406), data stores, databases etc. The communications interface 220 may utilize any now or hereafter known protocols, protection schemes, encodings, formats, packaging, etc. such as, without limitation, Wi-Fi, an infrared link, Bluetooth, etc. The communications interface 220 may also utilize The V2X communication links. The term “V2X” refers to a communication between a vehicle and any entity that may affect, or may be affected by, the vehicle. The information can include, but is not limited to, information specifying actions or operations have been performed, being performed and/or are to be performed by the object. user interface system 224 may be part of peripheral devices implemented within the AV 202 including, for example, a keyboard, a touch screen display device, a microphone, and a speaker, etc.

Figure 3:
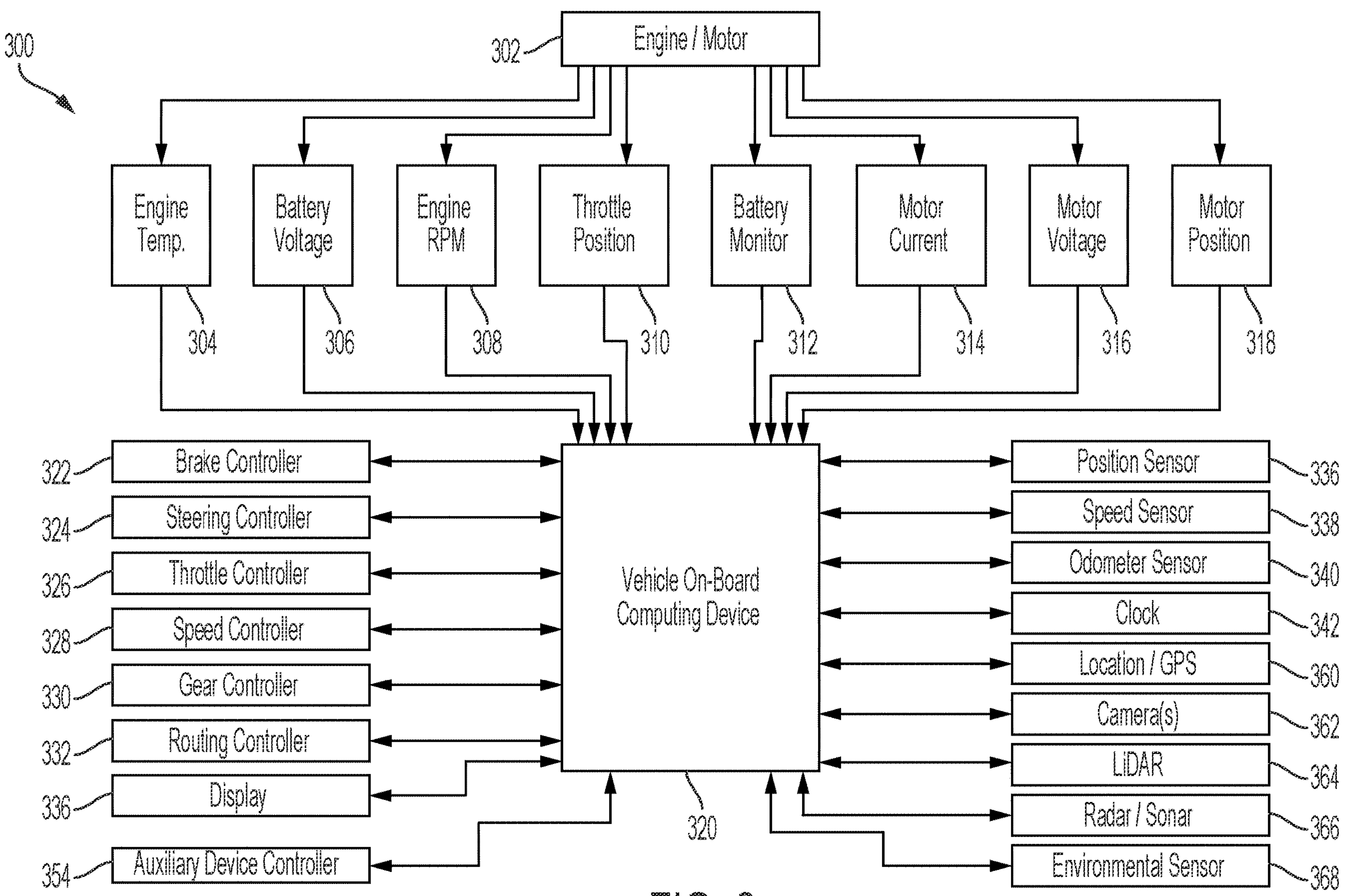
FIG. 3 illustrates an example architecture for a vehicle, in accordance with aspects of the disclosure.

FIG. 3 illustrates an exemplary system architecture 300 for a vehicle, in accordance with aspects of the disclosure. Vehicles 202 and/or 113 of FIG. 2 can have the same or similar system architecture as that shown in FIG. 3. Thus, the following discussion of system architecture 300 is sufficient for understanding vehicle(s) 202, 113 of FIG. 2. However, other types of vehicles are considered within the scope of the technology described herein and may contain more or less elements as described in association with FIG. 3. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 3, an example system architecture 300 for an AV includes an engine or motor 302 and various sensors 304-318 for measuring various parameters of the vehicle. In gas-powered or hybrid vehicles having a fuel-powered engine, the sensors may include, for example, an engine temperature sensor 304, a battery voltage sensor 306, an engine Rotations Per Minute (“RPM”) sensor 308, and a throttle position sensor 310. If the vehicle is an electric or hybrid vehicle, then the vehicle may have an electric motor, and accordingly includes sensors such as a battery monitoring system 312 (to measure current, voltage and/or temperature of the battery), motor current 314 and voltage 316 sensors, and motor position sensors 318 such as resolvers and encoders.

Operational parameter sensors that are common to both types of vehicles include, for example: a position sensor 336 such as an accelerometer, gyroscope and/or inertial measurement unit; a speed sensor 338; and an odometer sensor 340. The vehicle also may have a clock 342 that the system uses to determine vehicle time during operation. The clock 342 may be encoded into the vehicle on-board computing device 320, it may be a separate device, or multiple clocks may be available.

The vehicle also includes various sensors that operate to gather information about the environment in which the vehicle is traveling. These sensors may include, for example: a location sensor 360 (e.g., a Global Positioning System (“GPS”) device); object detection sensors such as one or more cameras 362; a lidar system 364; and/or a radar and/or a sonar system 366. The sensors also may include environmental sensors 368 such as a precipitation sensor and/or ambient temperature sensor. The object detection sensors may enable the vehicle to detect objects that are within a given distance range of the vehicle 202 in any direction, while the environmental sensors collect data about environmental conditions within the vehicle’s area of travel.

During operations, information is communicated from the sensors to a vehicle onboard computing device 320. The on-board computing device 320 may be implemented using the computer system of FIG. 13. The vehicle on-board computing device 320 analyzes the data captured by the sensors and optionally controls operations of the vehicle based on results of the analysis. For example, the vehicle on-board computing device 320 may control: braking via a brake controller 322; direction via a steering controller 324; speed and acceleration via a throttle controller 326 (in a gas-powered vehicle) or a motor speed controller 328 (such as a current level controller in an electric vehicle); a differential gear controller 330 (in vehicles with transmissions); and/or other controllers. Auxiliary device controller 354 may be configured to control one or more auxiliary devices, such as testing systems, auxiliary sensors, mobile devices transported by the vehicle, etc.

Geographic location information may be communicated from the location sensor 360 to the on-board computing device 320, which may then access a map of the environment that corresponds to the location information to determine known fixed features of the environment such as streets, buildings, stop signs and/or stop/go signals. Captured images from the cameras 362 and/or object detection information captured from sensors such as lidar system 364 is communicated from those sensors) to the on-board computing device 320. The object detection information and/or captured images are processed by the on-board computing device 320 to detect objects in proximity to the vehicle 202. Any known or to be known technique for making an object detection based on sensor data and/or captured images can be used in the embodiments disclosed in this document.

The on-board computing device 320 may include and/or may be in communication with a routing controller 332 that generates a navigation route from a start position to a destination position for an AV. The routing controller 332 may access a map data store to identify possible routes and road segments that a vehicle can travel on to get from the start position to the destination position. The routing controller 332 may score the possible routes and identify a preferred route to reach the destination. For example, the routing controller 332 may generate a navigation route that minimizes Euclidean distance traveled or other cost function during the route, and may further access the traffic information and/or estimates that can affect an amount of time it will take to travel on a particular route. Depending on implementation, the routing controller 332 may generate one or more routes using various routing methods, such as Dijkstra’s algorithm, Bellman-Ford algorithm, or other algorithms. The routing controller 332 may also use the traffic information to generate a navigation route that reflects expected conditions of the route (e.g., current day of the week or current time of day, etc.), such that a route generated for travel during rush-hour may differ from a route generated for travel late at night. The routing controller 332 may also generate more than one navigation route to a destination and send more than one of these navigation routes to a user for selection by the user from among various possible routes.

In various embodiments, the on-board computing device 320 may determine perception information of the surrounding environment of the AV 202. Based on the sensor data provided by one or more sensors and location information that is obtained, the on-board computing device 320 may determine perception information of the surrounding environment of the AV 202. The perception information may represent what an ordinary driver would perceive in the surrounding environment of a vehicle. The perception data may include information relating to one or more objects in the environment of the AV 202. For example, the on-board computing device 320 may process sensor data (e.g., LiDAR or RADAR data, camera images, etc.) in order to identify objects and/or features in the environment of AV 202. The objects may include traffic signals, roadway boundaries, other vehicles, pedestrians, and/or obstacles, etc. The on-board computing device 320 may use any now or hereafter known object recognition algorithms, video tracking algorithms, and computer vision algorithms (e.g., track objects frame-to-frame iteratively over a number of time periods) to determine the perception.

In some embodiments, the on-board computing device 320 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 320 may perform one or more prediction and/or forecasting operations. For example, the on-board computing device 320 may predict future locations, trajectories, and/or actions of one or more objects. For example, the on-board computing device 320 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the AV 202, the surrounding environment, and/or their relationship(s). For example, if an object is a vehicle and the current driving environment includes an intersection, the on-board computing device 320 may predict whether the object will likely move straight forward or make a turn. If the perception data indicates that the intersection has no traffic light, the on-board computing device 320 may also predict whether the vehicle may have to fully stop prior to enter the intersection.

In various embodiments, the on-board computing device 320 may determine a motion plan for the AV. For example, the on-board computing device 320 may determine a motion plan for the AV based on the perception data and/or the prediction data. Specifically, given predictions about the future locations of proximate objects and other perception data, the on-board computing device 320 can determine a motion plan for the AV 202 that best navigates the AV relative to the objects at their future locations.

In some embodiments, the on-board computing device 320 may receive predictions and make a decision regarding how to address objects and/or actors in the environment of the AV 202. For example, for a particular actor (e.g., a vehicle with a given speed, direction, turning angle, etc.), the on-board computing device 320 decides whether to overtake, yield, stop, and/or pass based on, for example, traffic conditions, map data, state of the AV, etc. Furthermore, the on-board computing device 320 also plans a path for the AV 202 to travel on a given route, as well as driving parameters (e.g., distance, speed, and/or turning angle). That is, for a given object, the on-board computing device 320 decides what to do with the object and determines how to do it. For example, for a given object, the on-board computing device 320 may decide to pass the object and may determine whether to pass on the left side or right side of the object (including motion parameters such as speed). The on-board computing device 320 may also assess the risk of a collision between a detected object and the AV 202. If the risk exceeds an acceptable threshold, it may determine whether the collision can be avoided if the AV follows a defined vehicle trajectory and/or implements one or more dynamically generated maneuvers is performed in a pre-defined time period (e.g., N milliseconds). If the collision can be avoided, then the on-board computing device 320 may execute one or more control instructions to perform a first type of maneuver (e.g., mildly slow down, accelerate, change lane, or swerve). In contrast, if the collision cannot be avoided, then the on-board computing device 320 may execute one or more control instructions for execution of a second type of maneuver (e.g., brake and/or change direction of travel).

As discussed above, planning and control data regarding the movement of the AV is generated for execution. The on-board computing device 320 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Figure 4:
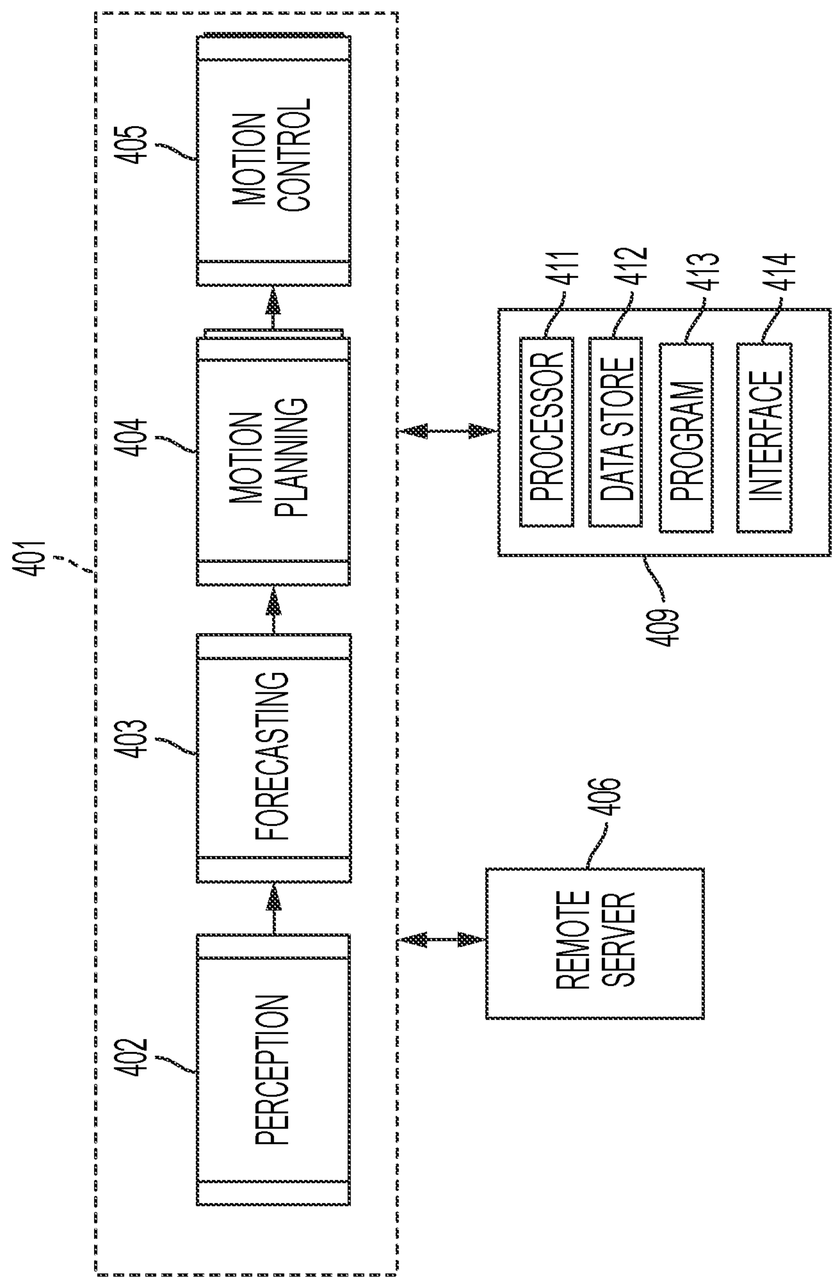
FIG. 4 illustrates a high-level overview of subsystems of an AV stack.

FIG. 4 shows a high-level overview of subsystems of an AV stack that may be relevant to the discussion below. Certain components of the subsystems may be embodied in processor hardware and computer-readable programming instructions that are part of a computing system 401 that is either onboard the vehicle or that is offboard and stored on one or more memory devices. The subsystems may include a perception system 402 that includes sensors that capture information about moving actors and other objects that exist in the vehicle's immediate surroundings. Example sensors include cameras, LiDAR sensors and radar sensors. The data captured by such sensors (such as digital images, LiDAR point cloud data, or radar data) is known as perception data. The perception data may include data representative of one or more objects in the environment.

The perception system may include one or more processors and computer-readable memory with programming instructions and/or trained artificial intelligence models that, during a run of the AV, will process the perception data to identify objects and assign categorical labels and unique identifiers to each object detected in a scene. Categorical labels may include categories such as vehicle, bicyclist, pedestrian, building, and the like. Methods of identifying objects and assigning categorical labels to objects are well known in the art, and any suitable classification process may be used, such as those that make bounding box predictions for detected objects in a scene and use convolutional neural networks or other computer vision models. Some such processes are described in Yurtsever et al., "A Survey of Autonomous Driving: Common Practices and Emerging Technologies" (published in IEEE Access, April 2020).

The vehicle's perception system 402 may deliver perception data to the vehicle's forecasting system 403. The forecasting system (which also may be referred to as a prediction system) will include processors and computer-readable programming instructions that are configured to process data received from the perception system and forecast actions of other actors that the perception system detects.

The vehicle's perception system 402, as well as the vehicle's forecasting system 403, will deliver data and information to the vehicle's motion planning system 404 and motion control system 405 so that the receiving systems may assess such data and initiate any number of reactive motions to such data. The motion planning system 404 and motion control system 405 include and/or share one or more processors and computer-readable programming instructions that are configured to process data received from the other systems, compute a trajectory for the vehicle, and output commands to vehicle hardware to move the vehicle according to the determined trajectory. Example actions that such commands may cause include causing the vehicle's brake control system to actuate, causing the vehicle's acceleration control subsystem to increase speed of the vehicle, or causing the vehicle's steering control subsystem to turn the vehicle. Various motion planning techniques are well known, for example as described in Gonzalez et al., "A Review of Motion Planning Techniques for Automated Vehicles," published in IEEE Transactions on Intelligent Transportation Systems, vol. 17, no. 4 (April 2016).

The subsystems described above may be implemented as components of an AV stack, which may be trained on various simulation scenarios. As described above, the system 401 on which the subsystems may be installed may be a vehicle's computer processing hardware, or it may be one or more memory devices that are offboard the vehicle. In addition, in the present embodiments, the system 401 on which the AV stack is installed will be in electronic communication with a training system 409. The training system 409 will include a processor 411, a data store 412 containing a variety of stored simulation scenarios, and a memory containing programming instructions 413 for generating, modifying and using simulation scenarios to train the system 401.

Optionally, the training system 409 also may include a user interface 414 for presenting information to a user and receiving information and/or commands from the user. For example, the user interface 414 may include a display via which the system may output graphic illustrations of simulation scenarios, as well as one or more menus or forms that present features or options for augmenting the scenario. The user interface also may include an input device such as a mouse, keyboard, keypad, microphone and/or touch-screen elements of the display via which the issuer may select variations for a displayed scenario. The variations may include new actors, configuration parameters for new or existing actors, or other information.

Notably, the present solution is being described herein in the context of an AV. However, the present solution is not limited to AV applications. The present solution may be used in other applications such as robotic applications (including autonomous home appliances and/or industrial robots), radar system applications, metric applications, and/or system performance applications. The systems and methods disclosed in this application may be used in a broad range of testing and planning settings to improve testing efficiency. Examples include stress testing, crash testing, or other multivariate and/or potentially destructive or damaging quality-control testing, such as flight testing of aircraft.

The AV's motion planning system 404 is trained on data that the vehicle may encounter in an environment and/or simulation scenarios generated based on real data/artificially created data.

A training data set for the motion planning system 404 may include one or more simulation scenarios. A simulations scenario includes one or more objects or actor in a scene through which the AV 202 may travel and the initial locations, dimensions, and other characteristics of the objects. Objects and actors may include streets, buildings, trees and other vegetation, traffic control signals and signs, other vehicles, cyclists, pedestrians, etc. Characteristics may include dimensions, initial location, maximum velocity, etc. Simulation scenarios may also define global parameters, such as weather-related parameters including visibility and road slipperiness due to simulated rain, fog, snow, or ice.

A "base scenario" refers to an overall configuration of a simulation scenario (over a period of time) including certain fixed parameters and certain variable parameters. As shown, the simulator receives base scenarios from a base scenario store 520. Fixed parameters refer to constant parameters that cannot be changed in a base scenario such as, without limitation, location of the simulation scene (e.g., an intersection, a freeway, a stop sign, etc.), the specific objects and actors, the number and type of each object or actor, or the like. The base scenarios may also be associated with map data identifying possible routes and road segments that a vehicle can travel on in the base scenario, e.g., to get from a start position to a destination position along a trajectory. Each base scenario may also include a destination to which the AV will travel in the simulation scene by generating and following a trajectory (and/or path). The variable parameters are parameters that can take different values during different executions of the base scenario, and each base scenario has a particular combination of variable parameters. Examples of the variable parameters can include, without limitation, initial position, size, type, orientation, velocity, acceleration, trajectory, or the like of an object or actor (e.g., pedestrian 114 or vehicle 113 in FIGS. 1A and 1B), events (e.g., traffic light signals, construction signals, etc.), environmental conditions (e.g., amount of light, rain, slippery roads, etc.), AV parameters (e.g., speed, heading, etc.), road configuration (e.g., width, speed limits), map parameters, or the like, in one or more base scenarios. In particular, the parameter data (fixed or variable) can be indicative of a relationship between a simulated object and the simulated environment. For instance, the state(s) can be parameterized into parameter data (e.g., indicative one or more parameters) within the context of the simulated environment. The parameter data can be indicative of a relationship (e.g., spatial relationship, temporal relationship, etc.) between the simulated object and the simulated environment. The parameter(s) can include metadata such as, for example, the relative distance between the simulated object and the simulated autonomous vehicle, the relative distance between the simulated object and another feature of the simulated environment (e.g., lane boundary, stop sign, exit ramp, cross walk, etc.), temporal parameters (e.g., the time it would take for the simulated autonomous vehicle to reach the first simulated object, etc.), the velocity of the simulated autonomous vehicle when the simulated object reaches a certain state, the traction of a road, visibility, and/or other parameters.

Referring back to FIGS. 1A and 1B, each base scenario may be augmented by modifying one or more variable parameter values to provide one or more variations of each base scenario (scenario variations). The variation shown in FIG. 1B includes an additional object (vehicle 119) in the scene, when the variable parameter is the number of objects in a scenario. In some examples, the variable parameter includes an altered value or range of values for parameters such as the initial locations, dimensions, or other characteristics of one or more objects in the base scenario. For example, the initial location of vehicle 119 may vary over a range of 100 meters along street 117.

Specifically, a scenario variation refers to one specific parameter value combination for a base scenario. For example, a base scenario may include a scenario where an AV turns left into an intersection and encounters oncoming traffic traveling straight through the intersection. The base scenario may have fixed initial positions and orientations of the AV, a traffic light state (e.g., green), and two oncoming cars traveling through the intersection. The variable parameters for the base scenario may include, for example, for the two cars the corresponding speeds, initial positions, lane, orientation, etc.; road conditions (e.g., slippery, snowy, etc.), the duration of the green traffic light state, or the like. For example, different base scenarios may include different combinations of the above variable parameters. For example, a first base scenario may include variable parameters of the duration of green light and the speed of the oncoming cars (while the other parameters assume fixed values). Another base scenario may include variable parameters of initial positions of the oncoming cars, their respective speeds, a different number of actors or objects and/or their respective speeds, and the road conditions (while the other parameters assume fixed values). Furthermore, during various executions of a base scenario, scenario variations may be generated where one or more of the variable parameters may assume different numerical values, ranges, states and/or other variables. A scenario variation may include a particular combination of parameter variable values. Parameters and their corresponding variations may be pre-defined, e.g., by a user as part of the process of configuring base scenarios, and/or may be automatically generated. Pre-defined variations may include a defined range of values and/or a defined distribution of values in a range. It should also be noted that variable parameters can include introduction of one or more new actors or object into the base scenario, varying the configuration for one or more of the actors that already exist in the scenario, varying the environmental conditions, varying the AV state, or the like.

This document describes methods and systems for automated generation and/or selection of useful base scenarios and/or scenario variations including the values assumed by the variable parameters of the base scenario to create a multitude of unique simulation scenarios that provide useful and non-redundant information for testing and/or training. For example, FIG. 1B shows a variation of the base scenario of FIG. 1A in which an additional actor—in this case, parked car 119—is added to the scene. A training system may store and use a scenario variation such as that of FIG. 1B, in addition to the base scenario of FIG. 1A, to test the AV stack. Generation of such scenario variations by augmenting a base scenario may reduce the number of base scenarios needed to effectively test the AV stack, and may result in memory saving, reduced computation power requirement, or the like.

Figure 5:
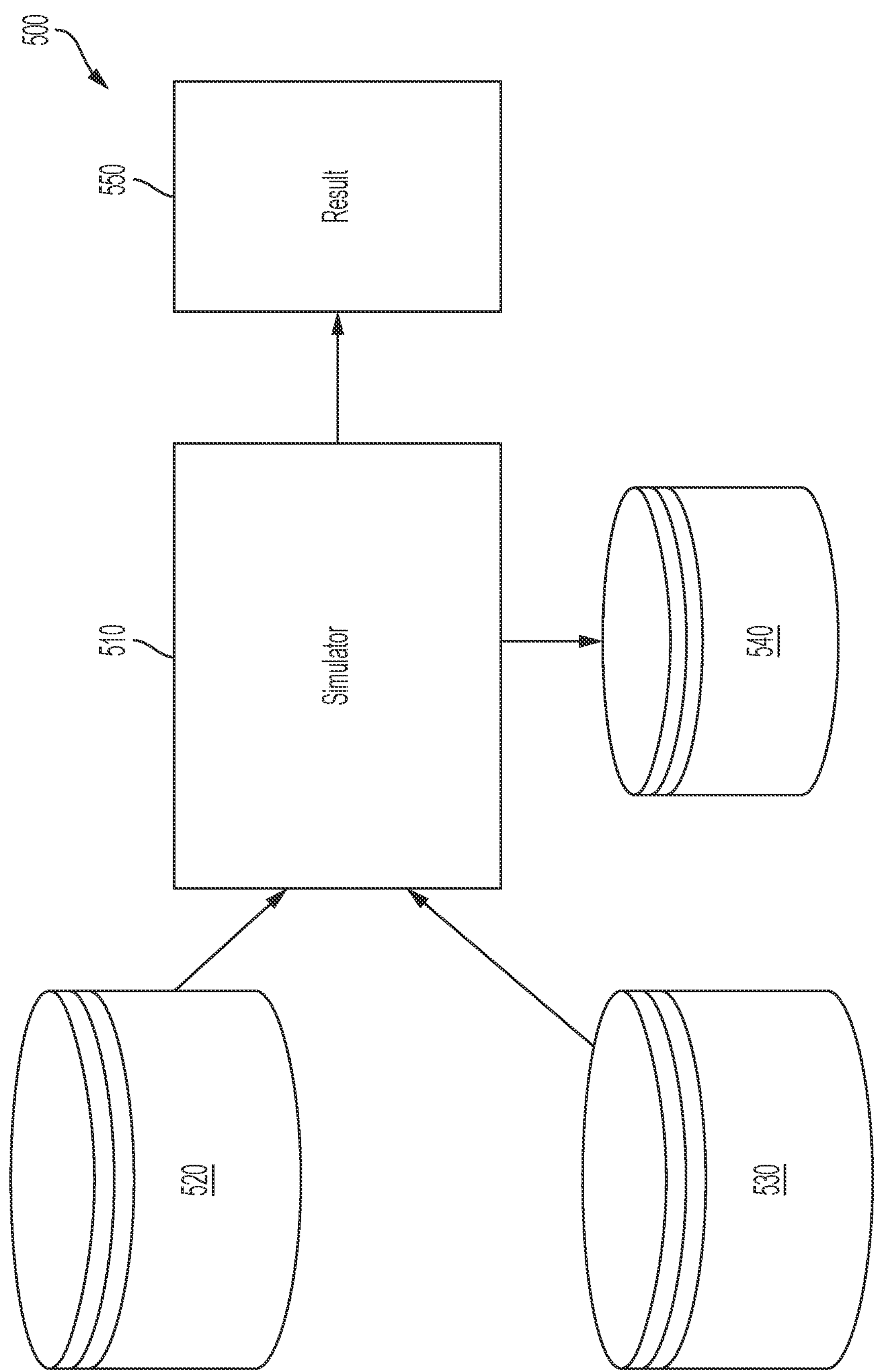
FIG. 5 illustrates an example simulation architecture.

FIG. 5 shows an example simulation system architecture 500. The system 500 may include a user input device 550, a simulator 510, data store(s) 520 and 530, and a data logging store 540, in communication with each other. The system 500 can be configured to generate one or more simulated scenarios and run a simulation within such scenarios. Optionally, the system 500 may also include a display device for presenting a visual representation of a simulated environment via a user interface on the display device (e.g., display screen(s), etc.).

A simulator 510 provides a virtual environment (e.g., a simulated scenario) in which an AV may operate. The simulator 510 can include a sensor data renderer that is configured to render simulated sensor data associated with the simulated environment. This can include, for example, simulated image data, Light Detection and Ranging (LIDAR) data, Radio Detection and Ranging (RADAR) data, and/or other types of data. The simulated sensor data can be indicative of the simulated object within the simulated environment of the simulated autonomous vehicle. This can include, for instance, simulated sensor data indicative of one or more locations of the simulated object(s) within the simulated environment at one or more times. The simulator 510 can provide simulated sensor data to an AV (simulated and/or recorded), as input data, and the AV can process the simulated sensor data associated with the simulated environment in a manner that is similar to how an autonomous vehicle would process sensor data associated with a real-world environment. Specifically, the simulator 510 may provide simulated signals to the AV (real or simulated) and/or the AV stack (as discussed above), so that the AV and/or the AV stack may process and react to the simulated signals. In some examples, the AV is virtual as well, receiving simulated signals and outputting control signals to the simulator and/or a data logger. For example, the simulator 510 may intercept or receive control signals from the AV stack, such as braking, accelerating, steering, or other signals, and use those signals to modify the position and/or orientation of the virtual AV in the simulation. In this way, the virtual AV may operate in the virtual environment in much the same way a real AV operates in the real world. Optionally, the AV may not be simulated but a real AV operating in a virtual environment. The simulator 510 may record data acquired during the execution of a simulation scenario including the AV/AV stack responses to the simulations. The data may include time-stamped information including the simulated signals provided to the AV stack and the control signals from the AV stack, such as throttle or braking effort, steering angle, gear selection, etc. The data may also include output from the AV's perception systems including object identification, classification, and state determination as described above. The recorded data may further include forecasting and/or prediction data, including future location and trajectory of actors. The data may also include information related to the position, velocity, and other aspects of the AV in the environment as the simulator executes the simulation. As shown, the simulator stores recorded data in a data logging store 540.

Details of one or more simulation environments may be defined in data files (such in data store 520), such as the base scenario definitions and variable scenarios described above that can be interpreted or executed by the simulator 510. Here, the simulator 510 also receives values for the various variable parameters from a simulation variation data store 530. The simulator may iteratively execute the base scenarios, augmented in each iteration by one of the values in the range of values defined by the simulation variation parameter(s). Simulation variations refer to simulation scenes created using the same base scenario using different values of one or more variable parameters.

The user input device 550 can be configured to control the motion of a simulated object within the simulation scenario. The simulated object can be a simulated actor such as, for example, a simulated vehicle, a simulated bicycle, a simulated motorcycle, a simulated pedestrian, and/or another type of object. The user input device 550 can include, for example, a steering wheel, handle bar, joystick, gyroscope, touch screen, touch pad, mouse, data entry keys or buttons, a microphone suitable for voice recognition, camera, and/or other types of user input devices. In some implementations, the type of the user input device 550 can have a form factor associated with a type of the simulated object (e.g., a type of simulated object it is intended to control). By way of example, the user input device 550 can include a steering wheel for controlling the motion of a simulated vehicle within the simulated environment. In another example, the user input device 550 can include a handlebar for controlling the motion of a simulated bicycle or motorcycle within the simulated environment. A user (e.g., a test operator) can provide user input to the user input device to control the motion of the simulated object during a simulation run in real-time and/or at least near real-time (e.g., accounting for any processing delays between when the user input device 550 is manipulated and when the simulated object is moved within the simulated environment and/or when the movement is depicted via a user interface).

In some examples, the simulator 510 produces simulation data logs 550 including data recorded during execution of a simulation (e.g., time stamped AV performance related data such as collected sensor data, perception data; simulation conditions/events in the base scenario; etc.) and a result of a simulation execution (such as a numerical output and/or a Pass/Fail result). A numerical output may be, for example, a distance from an object, lane boundary, etc.; the AV speed; time taken to execute a lane change, or the like. The Pass/Fail result refers to whether or not the performance of the AV achieved a desired outcome (e.g., stop before a stop sign, yield to a pedestrian, execute a lane change within the defined distance/time, etc.).

The simulator 510 may analyze the data logs whether an execution of the scenario is successful or unsuccessful. In various implementations, the simulator 510 may determine that the simulation was successful based on one or more criteria relating to the AV's performance or actions during the simulation such as without limitation, completion of a planned trajectory within a threshold period of time, adherence to traffic rule(s), predictions and forecasts made by the AV being within predefined error limits, avoidance of collision with objects and actors in the scene, maintenance of a threshold distance between the AV and other objects and actors in the scene, generation of a trajectory as desired during the simulation (e.g., veer to the left of an object instead of to the right, accelerate to change lanes, etc.), avoidance of harsh braking or extreme acceleration (or other ride quality metrics), or the like. For example, a simulation execution is classified as successful or unsuccessful, e.g., based on whether the AV executes an expected action in the scenario within expected tolerance limits. A conflict detected by the AV may impede or prevent the AV from continuing on the trajectory 102, or the AV may detect an unpredictable and/or novel occurrence which falls outside the parameters of the AV's programming or training, causing the AV to slow or stop or be unable to continue on the planned trajectory 102. If the AV appropriately slows or stops in such scenarios, the simulation is successful. Other actions performed by the AV may lead to the simulation being unsuccessful. For example, the AV's programming or training may require the AV to follow all traffic rules and/or maintain distances between the AV and other objects in the scene and near the AV, including above the AV. Strict adherence to all traffic rules and/or maintaining distances between the AV and other objects may also cause the AV to slow or stop or be unable to continue on the planned trajectory 102. A scenario may be classified as unsuccessful if the AV does not complete the planned trajectory 102 within a threshold period of time, and the simulation results may be used for retraining the AV stack that allows the AV to complete the trajectory. For example, referring back to FIG. 1B, there may be a value for a characteristic of vehicle 119 (e.g., a range of values for the initial position in the scene) that result in a conflict between AV and vehicle 119. There may be other values for the characteristic that do not result in a conflict. Therefore, the scenarios that result in a conflict may be classified as unsuccessful. The scenario may be further classified based on a secondary success criterion. For example, the scenario may be classified as successful if the AV completes a planned trajectory 102 in the scenario while maintaining a threshold distance between the AV and objects or actors in the scene or maintaining a minimum distance to a lane boundary. The scenario may be classified as unsuccessful if the AV completes a planned trajectory 102 in the scenario within a threshold period of time, but fails to maintain the secondary success criterion (e.g., fails to maintain a minimum distance to other objects, actors, or lane boundaries, violates a traffic rule or regulation, etc.). The simulation result may be analyzed to review metrics other than collision data or trajectory completion data, such as comfort, stranding, collision risk, etc. in order to evaluate the success of a scenario execution.

A nearly infinitely large number of simulation variations for the same base scene may be created using different combinations of values of the variable parameters. In addition, the number of base scenarios with specific parameter combinations can also be infinite. However, when running simulations, there may be a limited number of situations having certain characteristics. For instance, there may be a need to test the AV stack in "outlier" cases for which there may be very few examples. In other words, some simulation variations may not provide a significant training advantage over other variations and combinations. For example, in FIG. 1B, training scenarios that do not result in a conflict (e.g., collisions or near-collisions) between AV 202 and vehicle 119 may not provide a desired incremental benefit in improving the AV stack training after a certain point (e.g., the loss function of a machine model training may not further be reduced). That is, each of the scenarios may present a substantially similar set of circumstances to an AV 202 processing the scenario. Applying any of the scenarios to the AV's stack may cause the AV's stack to generate a substantially similar response. Therefore, one (or few), instead of all, of those scenarios may be selected for training the motion planning model to achieve a substantially similar result. Training scenarios with very different initial conditions and/or outputs, however, may present substantially different circumstances to an AV stack processing the scenario. For example, scenarios which do result in a conflict between AV 202 and vehicle 119 may provide a substantially different training benefit than scenarios which do not result in a conflict. Therefore, selecting scenarios which are classified as both successful and unsuccessful to include in training data may result in a substantially improved result over selecting only one of those scenarios. The more unique or substantially different scenarios that are used to train a motion planning model, the better that the model can be at making motion planning decisions.

It should also be noted that the number of base scenarios and corresponding scenarios variations are limitless, and training resources (e.g., computing power and time) are finite. In addition, unsuccessful scenario variations may need to be analyzed and/or triaged by experts to try to understand how to improve the AV's motion planning system adding a human cost to each unsuccessful scenario variations. In other words, scenario variations that are unsuccessful for substantially the same reason may create redundant triage and/or analysis, thus expending human resources unnecessarily. Therefore, removing redundant unsuccessful or successful scenario variations may save both computing resources and human resources related to triaging and/or analyzing the training results.

A parameter space for each base scenario may also be generated using any now or hereafter known methods. A parameter space for a base scenario refers to a space of all possible parameter values of variable parameters of that base scenario. The ranges of values of the variable parameters may form the axes of a plot, and particular scenario variations (and/or scenario variation outcomes) of the base scenario may be plotted against these axes to illustrate how different regions of the parameter space produce different types of outcomes in the base scenario. For example, for a base scenario including two variable parameters, the parameter space will be a two-dimensional space. However, any multi-dimensional parameter space is within the scope of this disclosure. For each base scenario, a graphical boundary may be fitted in the parameter space (including the variable parameters for the base scenario) such that variable parameter values included on one side of the boundary result in successful execution of corresponding scenario variations and variable parameter values on the other side of the boundary result in unsuccessful execution of corresponding scenario variations.

Figure 6A:
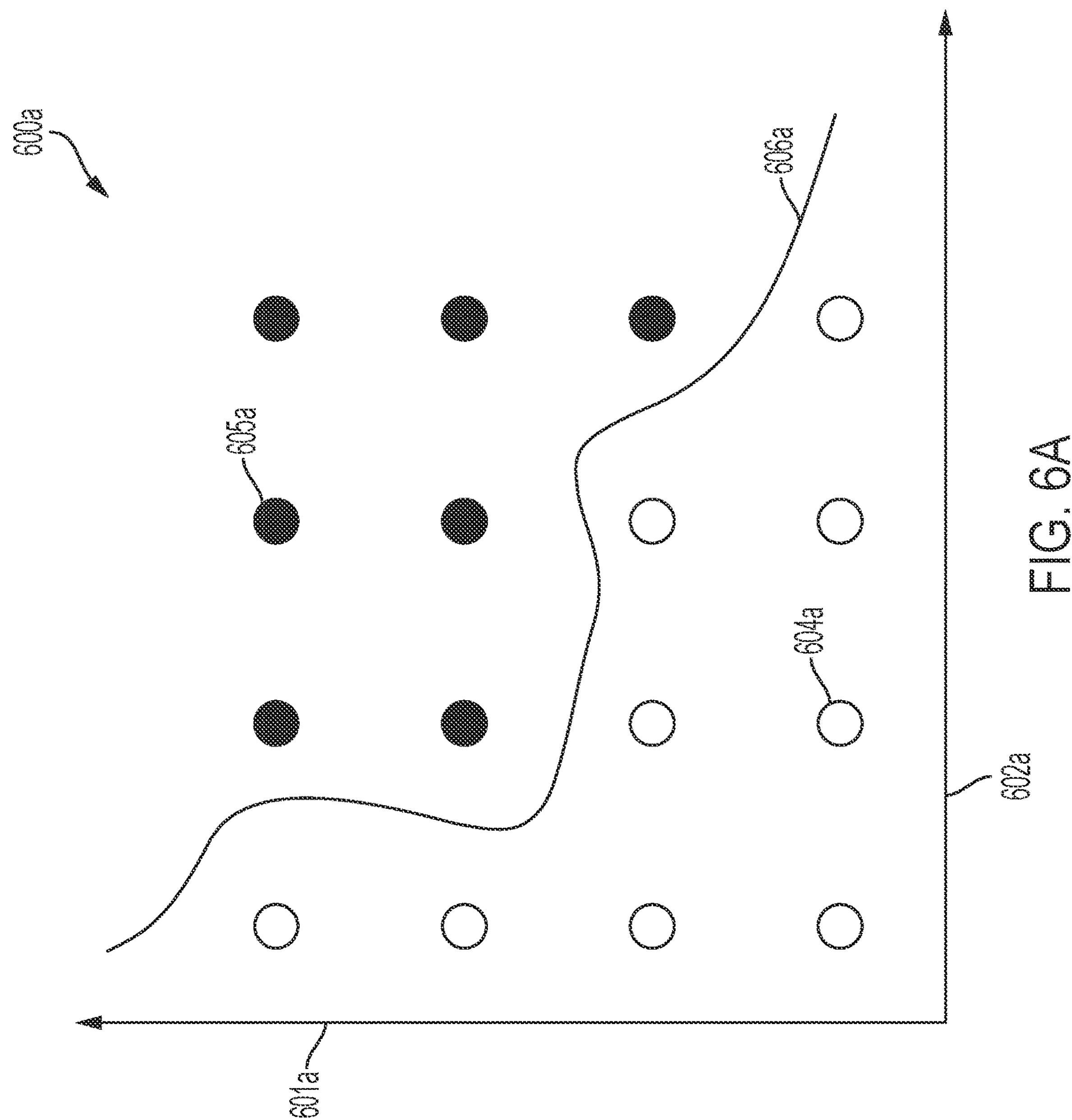
FIGS. 6A and 6B illustrate example parameter spaces for base scenarios and corresponding system boundaries.
Figure 6B:
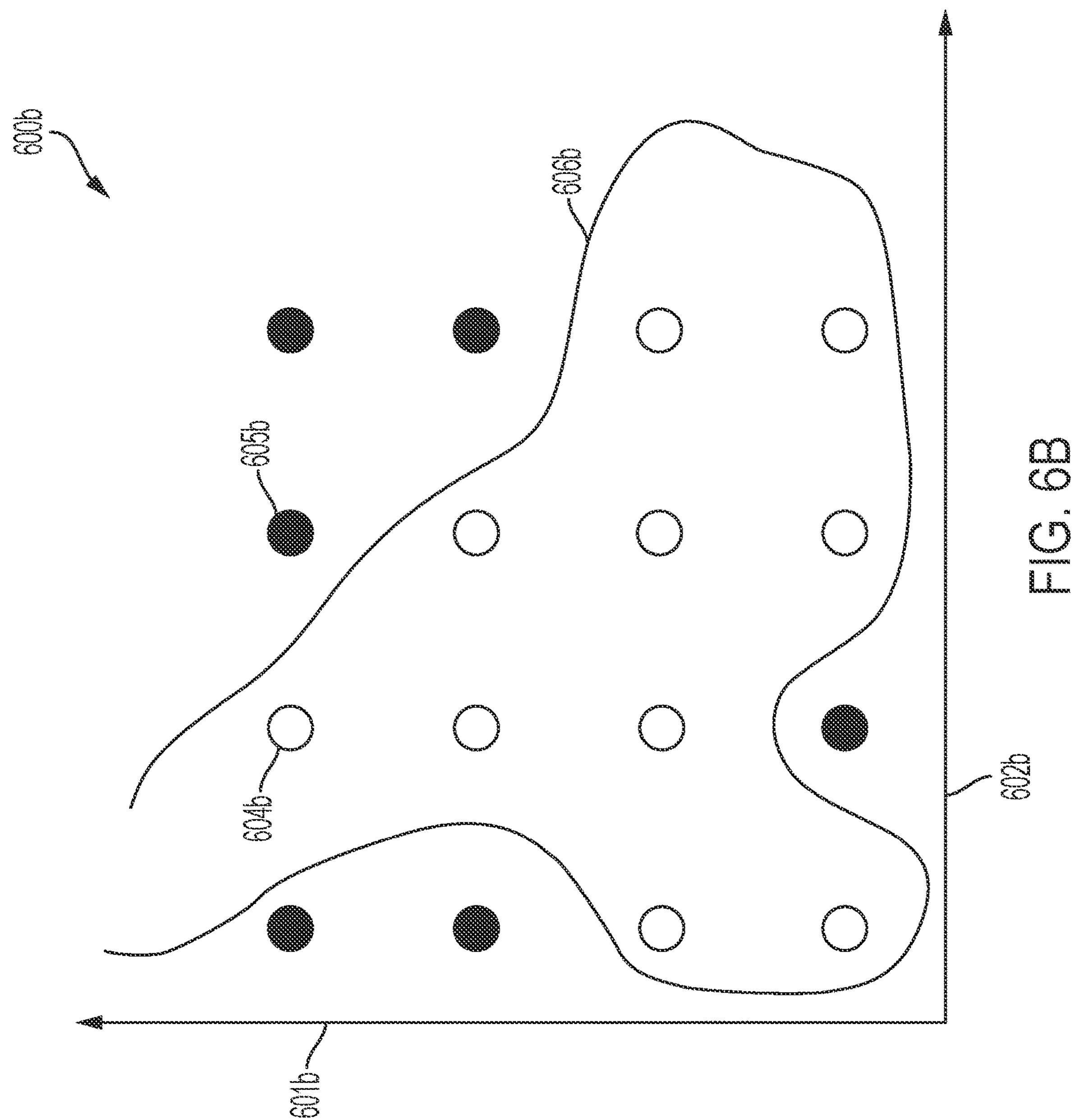

FIG. 6A shows an example 2-dimensional parameter space 600*a* that plots the values of two variable parameters that are each varied over a range within a base scenario, for fitting a boundary 606*a* between successful and unsuccessful scenario variations. For example, one variable parameter may be the walking speed of a pedestrian in the base scenario and the other variable parameter may be the speed of the AV. For each pair of values, the corresponding scenario variation is classified as successful or unsuccessful (by analyzing simulation data logs, as discussed above). Each axis (601*a*, 602*a*) represents one of the two variable parameters (e.g., pedestrian speed and AV speed). The circles indicate the scenario variations created using different values of the variable parameters. That is, each value of the pair of values may be varied to arrive at the scenario variation. Scenario variations that are classified as successful are indicated with a white circle 604*a*. Scenario variations that are classified as unsuccessful are indicated with a black circle 605*a*. A boundary 606*a* between the successful and unsuccessful scenario variations is indicated by line 606*a*. The boundary 606*a* passes between neighboring scenario variations where one neighbor is classified as successful and the other neighbor is classified as unsuccessful. FIG. 6B shows another example of parameter space 600*b* and another boundary 606*b* generated by plotting successful and unsuccessful scenario variations, where the scenario variations are generated by varying two variable parameter values. The boundary 606*b* between successful and unsuccessful scenarios shown on parameter space 600*b* (with axes 601*b*, 602*b*, separating successful variations 604*b* from unsuccessful variations 605*b*) is more convoluted than the boundary 606*a* between successful and unsuccessful scenarios shown on parameter space 600*a*.

Such a boundary may be used for selection of scenario variations for execution because variable parameter values which are close to the boundary may present substantially different circumstances to the AV, even with only minor variations to the variable parameter value, and may provide more useful data for training and/or testing the AV stack. A small variation in the initial position of vehicle 119 may change whether the AV 202 detects a conflict or does not detect a conflict. For example, a small change in the speed of a pedestrian might change the motion planning trajectory of the AV to either stop and wait for the pedestrian to cross the street, or to continue on its path and go around the pedestrian. Parameter variation values which are far from the boundary, on the other hand, may present substantially similar circumstances to the AV, even with large variations to the variable parameter value. For example, there may be a large range of initial positions for vehicle 119 which do not result in the AV 202 detecting a conflict, e.g., because the none of the initial positions correspond to the AV 202 and the vehicle 119 arriving at an intersection under circumstances that could give rise to a conflict. Because the more unique or substantially different scenarios that are used to train an AV stack, the better that the model can be at making decisions, scenario variations of a base scenario associated with ranges of values that are close to the boundary may be more relevant, and may generate more useful training/testing data.

Figure 7:
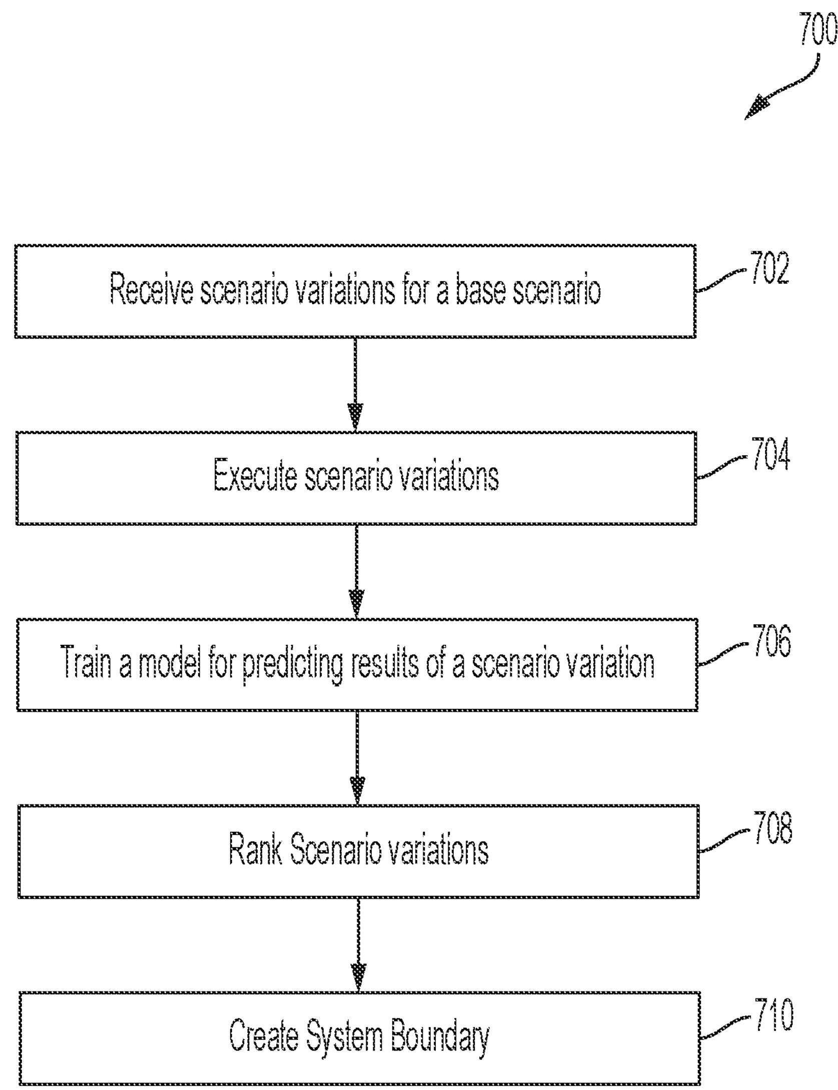
FIG. 7 illustrates an example method for generating a system boundary for a base scenario.

FIG. 7 illustrates an example method 700 for generating a boundary between successful and unsuccessful scenario variations. At step 702, the method 700 includes receiving multiple training scenario variations for a base scenario. Each training scenario variation may include a base scenario and one or more variable parameters that assume a range of parameter values. In some examples, the system may receive the scenario variations from a data store of a computing device. In some examples, the method may include generating the scenario variations for a base scenario by identifying one or more variable parameters of a base scenario (such as the characteristic on an object in the scenario) and generating multiple values for all such variable parameters. For example, the simulation variations may be generated by using multiple values for a variable parameter corresponding to the available traction of roads in a base scenario, e.g., to simulate snowy or icy surfaces.

The system may then execute the training scenario variations (704)—using any of the models discussed above (e.g., software, hardware and/or vehicle loops)—to collect simulation outcomes (i.e., successful or unsuccessful). The training scenario variations and the corresponding outcomes may be used to train a machine learning model and/or to fit a statistical model for predicting the results of various scenario variations for that base scenario (706). The machine learning model/statistical model is also trained to predict the uncertainty or entropy of achieving a particular outcome by, for example, directly analyzing probabilities for the AV passing or failing a simulation, for numerical results being in specific ranges, or by analyzing the entropy of the outcomes. For example, the system may use a statistical model may to determine the variance or standard deviation of a distribution of outcomes. A greater variance in the distribution is associated with greater entropy (e.g., uncertainty) in the outcome.

This uncertainty estimate (e.g., a corresponding uncertainty score) per scenario variation is a key component and can be used inseveral different ways. For example, if the uncertainty score is high for a given scenario variation it means that the AV behavior is likely to change between successful and unsuccessful given small changes in the variable parameter values. Such scenario variations are more important to track and to repeat on a regular basis in order to detect changes in performance as a result of software changes to, for example, the AV stack. On the other hand, scenario variations, which are either a clear successful or a clear unsuccessful may not be as important to track because changes in the AV stack are less likely to affect their result or outcome. Hence, a selection and prioritization of scenario variations may be performed based on the ranking of scenario variations according to their likelihood of changing successful and unsuccessful results.

In some examples, a model is trained to predict a numeric scenario result. For example, a numeric scenario result may be the minimum distance maintained between an AV and other objects or actors in a scene. The multi-state classifier may be trained to predict ranges of minimum distances maintained based on (a) the set of values associated with the simulation variations and (b) the minimum distance maintained by the AV in the associated scenario variation, when executed. The values with the highest degree of entropy in the model represent values with the highest outcome uncertainty and may be numerically defined as an uncertainty score. That is, a small change in the value may result in a systematic change to the scenario, resulting in a substantially different scenario outcome. Multi-state classifiers may be trained to predict other scenario outcomes as well.

Figure 8:
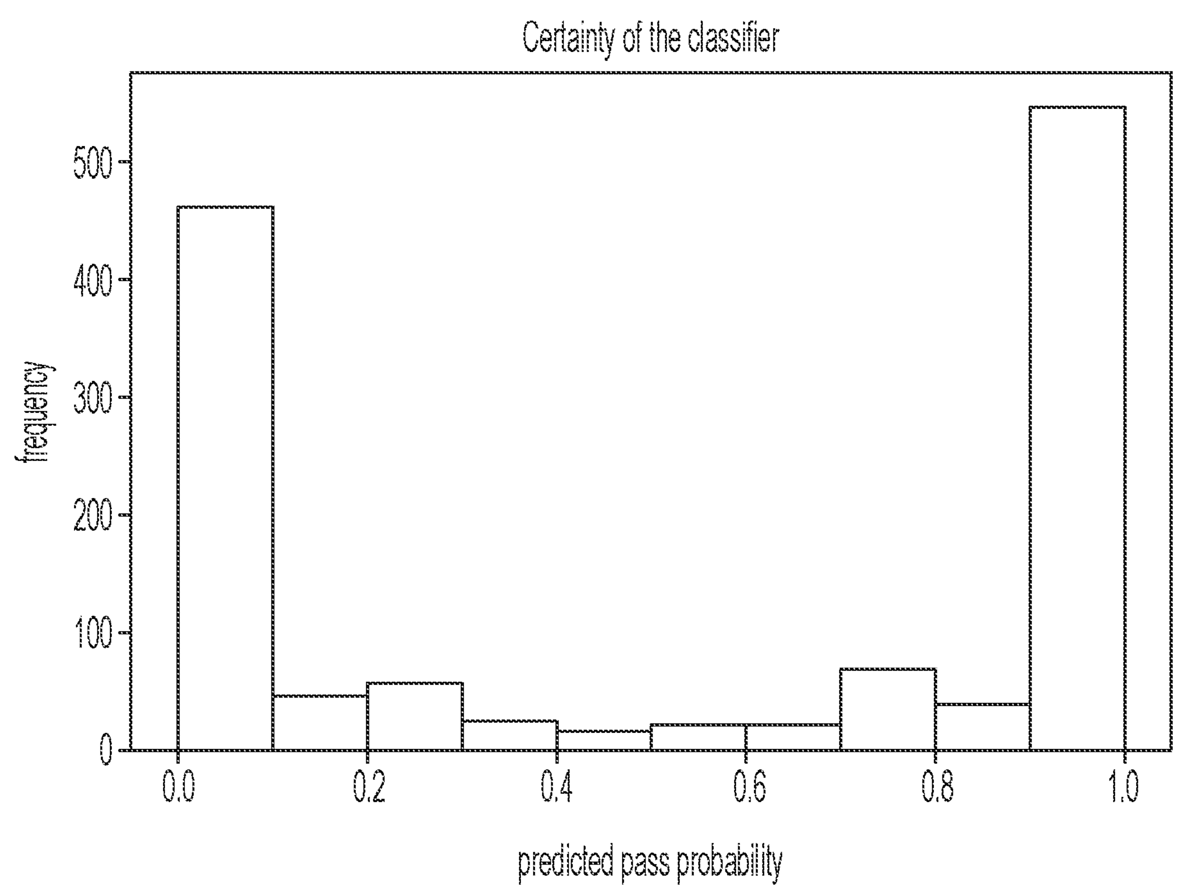
FIG. 8 illustrates an example entropy distribution of outputs of scenario variations.

At 708, the system may, therefore, rank various scenario variations based on the associated entropy or uncertainty score. An example entropy of the output distribution (pass or fail) of a machine learning model trained on scenario variations of a base scenario is shown in FIG. 8. Here, the trained machine learning model is presented with a range of values for a scenario variation. For each value in the range of values, the model determines a probability that the scenario will be successful. A high probability indicates a high level of certainty that the scenario will be successful. A low probability indicates a high level of certainty that the scenario will be unsuccessful. The determined probability output may be plotted in discrete bins in a chart such as the chart of FIG. 8. Here, the probability outputs of a trained machine learning model are plotted in bins of 20%, i.e., from 0-20%, 20-40%, etc., for a range of more than one thousand parameter values. Each probability output between 0 and 20% is plotted in the first bin. This bin represents probabilities corresponding to a high level of certainty that the scenario will be unsuccessful (a low probability of a successful scenario). Conversely, each probability output between 80 and 100% is plotted in the last bin. This bin represents probabilities corresponding to a high level of certainty that the scenario will be successful (a high probability of a successful scenario). As shown, the vast majority of probabilities fall into one of the first or the last bin. The remaining bins represent the much smaller number of parameter values corresponding to lower levels of certainty in the predicted outcome of the scenario. These values may close to the boundary where a small change in the value may result in a systematic change to the scenario, resulting in a substantially different scenario outcome. Therefore, including these values in scenario variations may be more valuable in testing/training scenarios than including values corresponding to greater levels of certainty. For example, scenario variations that have a predicted pass probability between about 0.4 to about 0.6 (i.e., higher uncertainty with respect to their results) may be ranked higher than scenario variations that have a pass probability of less than about 0.4 or greater than about 0.6 (i.e., higher certainty of pass or fail results). The histogram of FIG. 8 is meant to be illustrative. Machine-learning models with other entropy distributions are also within the scope of this disclosure, and entropy distributions from machine-learning models may be plotted in histograms having a variety of fixed or variable bins, other than the bins depicted in FIG. 8

Figure 9:
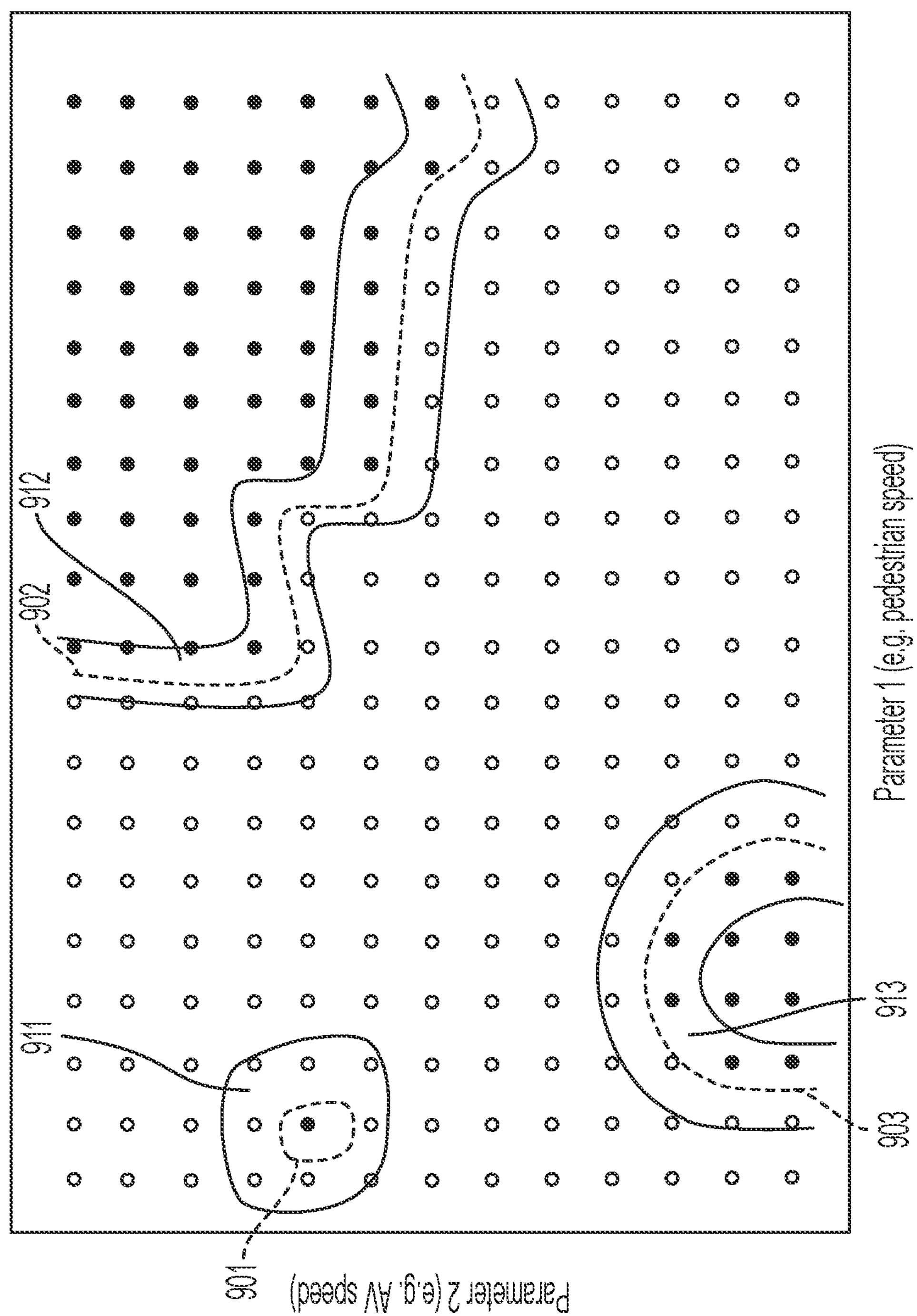
FIG. 9 illustrates an example parameter space for a base scenario having variable parameters of AV speed and pedestrian speed.

At 710, the system may create one or more system boundaries in parameter space that separate the unsuccessful scenario variations from the successful scenario variations (based one predicted and/or actual outcomes). For example, the system boundary for the base scenario may be generated by fitting an approximate model boundary to the scenario variations as being a line that passes through or near points having predicted pass probability of about 0.5. In another example, the system boundary for the base scenario may be generated by fitting an approximate model boundary to the scenario variations that lie within a threshold entropy range associated with the scenario variation results. For example, region(s) may be defined in the parameter space to include scenario variations that lie within a threshold entropy range (e.g., those having a predicted pass probability between about 0.4 to about 0.6), and a system boundary line may be defined to pass through such region(s), e.g., at or near a point of maximum entropy, e.g., a pass/fail rate of 50%). For example, the system boundary may be a line that passes through or near points having predicted pass probability of about 0.5. An example parameter space for a base scenario having variable parameters of AV speed and pedestrian speed is shown in FIG. 9 where three regions 901, 902, and 903 including simulation variations with high entropy are identified. Boundaries 911, 912, and 913 are defined to pass through the center (at or near the 50% probability point) of such regions.

The closer a scenario variation is to the system boundary, the higher it is in the ranking. The ranking can be used for selecting scenario variations and their results that are most relevant because higher ranking scenario variations are on the above defined boundaries, where AV behavior changes systematically. Such prioritization of scenarios variations based on the ranking can be done for both, the execution of scenario variations as well as for future triaging of scenario variation data logs and outcomes by a human. For example, considering that the simulation executions are repeated on a regular basis, the prioritization can be used for reducing the number of nightly runs to scenario variations where successful to unsuccessful (or vice versa) result changes are most likely. This does not mean that all other scenario variations don't need to be executed at all, but it means that a different frequency is applied. For example, the prioritized scenario variations may be executed more frequently (e.g., daily) compared to the other scenario variations (e.g., weekly or biweekly). Similarly, for manual—human driven—scenario results triaging, it is often unrealistic to triage all executed scenario variations, and the prioritization list can be used to select a sample of meaningful scenario data logs or outcomes to triage, as these show cases where relevant results happen (optionally in combination with an analysis of how scenario results for scenario variations changed over time) such that scenario results are triaged with a focus on results that are close to the system boundary and/or that changed due to a change in the AV stack. Such targeted triaging to identify relevant edge cases, where the AV behavior is changing between successful/unsuccessful allows for optimal leveraging of human workforce by eliminating from the triage simulations election obviously failing parameter combinations.

It should be noted that the boundary between successful and unsuccessful scenario variations of a base scenario may depend on more than the base scenario configuration. For example, as the AV's motion planning system learns and improves over time, its ability to avoid conflicts may improve. The AV stack's other performances (e.g., prediction, forecasting, etc.) may also change over time. Scenario variations which were previously classified as unsuccessful may become successful as the AV (or AV stack) learns and improves or the AV's performance changes. Therefore, ranges of variable parameter values which are somewhat further (e.g., within a threshold distance) from the boundary may also be relevant to include in the set of training or testing simulation scenarios, so that the training scenarios detect and/or accommodate a boundary that moves over time. The boundary may be reestablished after a full run of all scenarios and/or upon detection of certain events (e.g., periodically, after certain number of scenario executions, after relevant changes to the AV stack, etc.) to accommodate boundaries that move greater than the threshold distance. Optionally, the scenario variations near the system boundary may be executed more frequently than those far away from the boundary (which may be executed only when trigger events are detected—such as changes to the boundary, relevant changes to the AV stack, or the like).

Optionally, in various embodiments, the selection and prioritization of scenario variations for execution (and/or triaging) may also be based on failure modes of the scenario variations. For example, the system may cluster the scenario variations for a base scenario by failure modes, and only select a certain number of the high-ranked scenario variations per failure mode (while discarding the rest). The clustering can be done by, for example, using system reported failures coming from different failure checks and/or from statistical clustering methods like hierarchical clustering or gaussian mixture models using the input and numerical output features as clustering inputs. The system may detect similarities among groups of failures suggesting that the group is associated with a single failure mode. The system may use the cluster information to refine the priority of scenario variations or sets of scenario variations. For example, the system may prioritize the highest-ranking scenario variations associated with each cluster (each distinct failure mode) above the second highest-ranking set of scenarios associated with a different cluster. Other statistical methods may also be used to detect clusters that indicate distinct failure modes. Other methods include performing a hierarchical cluster analysis or applying a mixture model such as a Gaussian mixture model. Doing clustering by failure mode enables the system to pick the highest ranked scenarios per failure mode, and thus ensures a diverse selection of scenario variations for triaging and/or execution. The regions 901, 902, 903 illustrated in FIG. 9 (discussed above) may be clustered based on failure modes and the associated boundaries are used for selecting scenario variations per failure mode. Each cluster includes closely related scenario variations based on failure mode. That is, scenario variations included in each cluster are associated with a relatively small range of values for each object characteristic. The region between clusters, in contract, is associated with a relatively larger range of values for each object characteristic. Based on the clusters, the system may treat each cluster as though it represents a single failure mode. Therefore, the system may revise or refine priorities for training scenarios to emphasize each distinct failure mode. For example, the system may prioritize the highest-ranking scenario variations associated with each cluster (each distinct failure mode) above the second highest-ranking set of scenarios associated with a different cluster. The system may balance the number of training scenarios associated with each failure mode, e.g., by reducing the priority of excess training scenarios associated with certain failure modes, or selectively eliminating training scenarios associated with certain failure modes, thus achieving greater diversity of failure modes among the training data. In some examples, the system labels unsuccessful scenario variations to indicate which unsuccessful scenario variations are associated with the same cluster. The label may be a unique identifier associated with the cluster and generated by the system. In some examples, the label is based on reports or failure checks from one or more components of the AV's stack. The unsuccessful scenario variations may be analyzed to determine how to improve the AV's systems. Labeling the unsuccessful scenario variations by cluster or failure mode provides additional information to analysts, allowing analysts to more effectively triage and/or prioritize analysis of unsuccessful scenario variations, e.g., to ensure that at least one unsuccessful scenario variation from each cluster is analyzed. This approach may allow analysts to uncover relevant, but rare failure modes and within a limited analysis time budget.

It should be noted that the above system boundary approach for selecting scenario variations allows for systematic tracking of AV performance changes over time and/or development cycles because such changes are described by the changes in the system boundary. Moreover, surprising failures can be identified using the fitted machine learning model because if a simulation run strongly deviates from the prediction, it may be an indication of a potentially relevant singularity. The proposed solution can also be used to predict the scenario uncertainty for parameter combinations, which have not been constructed or simulated yet. Hence, suggestions for new scenario variations can be made, targeting, e.g., areas close to thesystem border (discussed below in more detail with respect to FIG. 10).

As discussed above, automated generation of simulation base scenarios (each having a unique combination of variable parameters) and their corresponding variations is one of the most important activities to make the AV testing/training precise and scalable. During the scenario generation, various parameters (constant or variable) and their values are considered and combined with each other. The challenge lies in deciding, what parameters to choose to be combined, what values of these parameters need to be considered and how to sample and combine them. Performing this process manually based on the expert best guess does not scale due to multidimensional space of the parameter combinations. In addition, there are several constraints to be considered such as selection of realistic scenario variations, selection of a dense parameter space such that scenarios are not missed, selection of diverse scenario variations (with minimal overlap and redundancy), budget constraints such as allowed number of stimulation runs, manual constraints, adaptation as the AV stack changes, or the like. The following discussion describes an automated process of defining and selecting base scenarios and corresponding scenario variations that provides optimal testing and training close to system boundaries, while providing an adaptive reassessment of the parameters set after the change of the system behavior to stay focused to the system boundaries. The systems and methods of this disclosure also avoid situations or combinations of parameters with white spots and/or duplicates in the parameters space. At the same time the process is designed to keep the number of simulations lean to remove unneeded scenarios if the system boundary is moving due to software updates.

Figure 10:
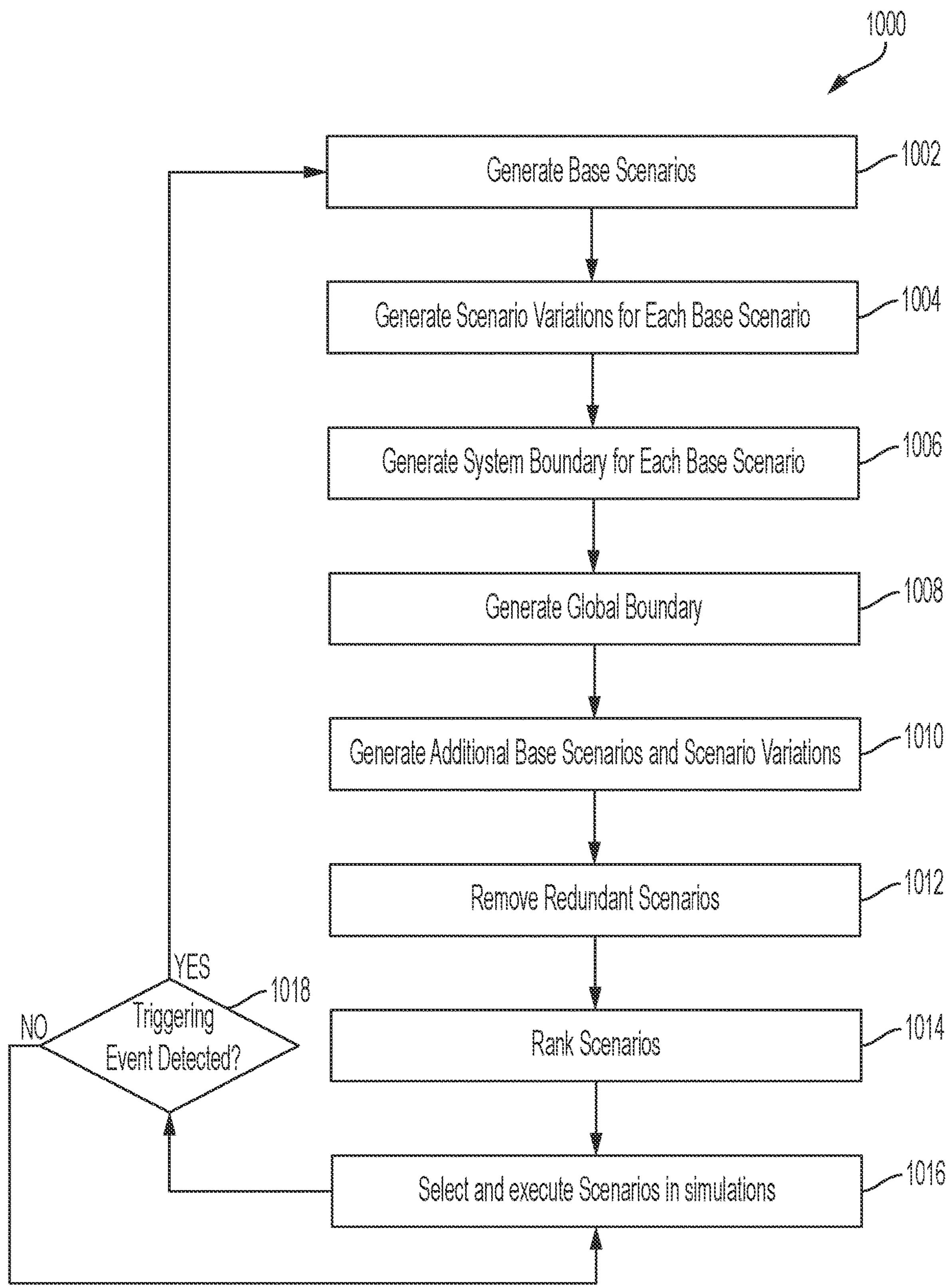
FIG. 10 illustrates an example method for generating and selecting simulation scenarios.

FIG. 10 shows an example method 1000 for refining and selecting variable parameters for generation or selection of useful simulation scenarios. At step 1002, the method 1000 includes generating multiple base scenarios by, for example, uniform sampling of data points from a finite design space (e.g., Euclidean space) of possible parameters—variable and constant—that can be used for generating base scenarios. Examples of uniform sampling methods may include, without limitation, uniform random number sampling, latin hypercube sampling, or fast flexible filling designs. Such methods sample base scenarios from parameter ranges or parameter distributions such that scenario configurations in the base scenarios may be generated randomly. Each base scenario may include, for example, constant and variable parameters relating to the environment, number of actors, their starting positions and actions during the course of the scenario, a map section where the actors and AV are traveling, environmental conditions (e.g., weather and road condition), initial speeds and locations of a set of actors and the AV, a set of maneuvers each actor will take during the execution, and start and end time of scenario.

Optionally, for each sampled base scenario, the method may also include generating the corresponding scenario variations (1004). Similar to the generation of the base scenarios, the system may uniformly sample from the variable parameters and associated value ranges to generate the scenario variations. Optionally, the process may include selecting the variable parameters to be varied in using statistical screening methods before actually creating the scenario variations. Statistical screening is the process of identifying process parameters which can be varied but which actually do not have a significant impact on the observed result.

At step 1006, the method may include, for each base scenario generating the system boundary (as discussed above with respect to FIG. 7). For example, as described above, the method may predict (using the generated machine learning or statistical model trained using actual scenario variation execution results, as discussed with respect to of FIG. 7) a result that will be obtained by executing a scenario variation, and the corresponding entropy of the prediction. A system boundary may be generated for each base scenario, in parameter space, based upon the entropy of the predicted results of the scenario variations (1008). Optionally, the method may include executing an initial set of scenario variations corresponding to a base scenario for determining the machine learning model/statistical model.

Figure 11:
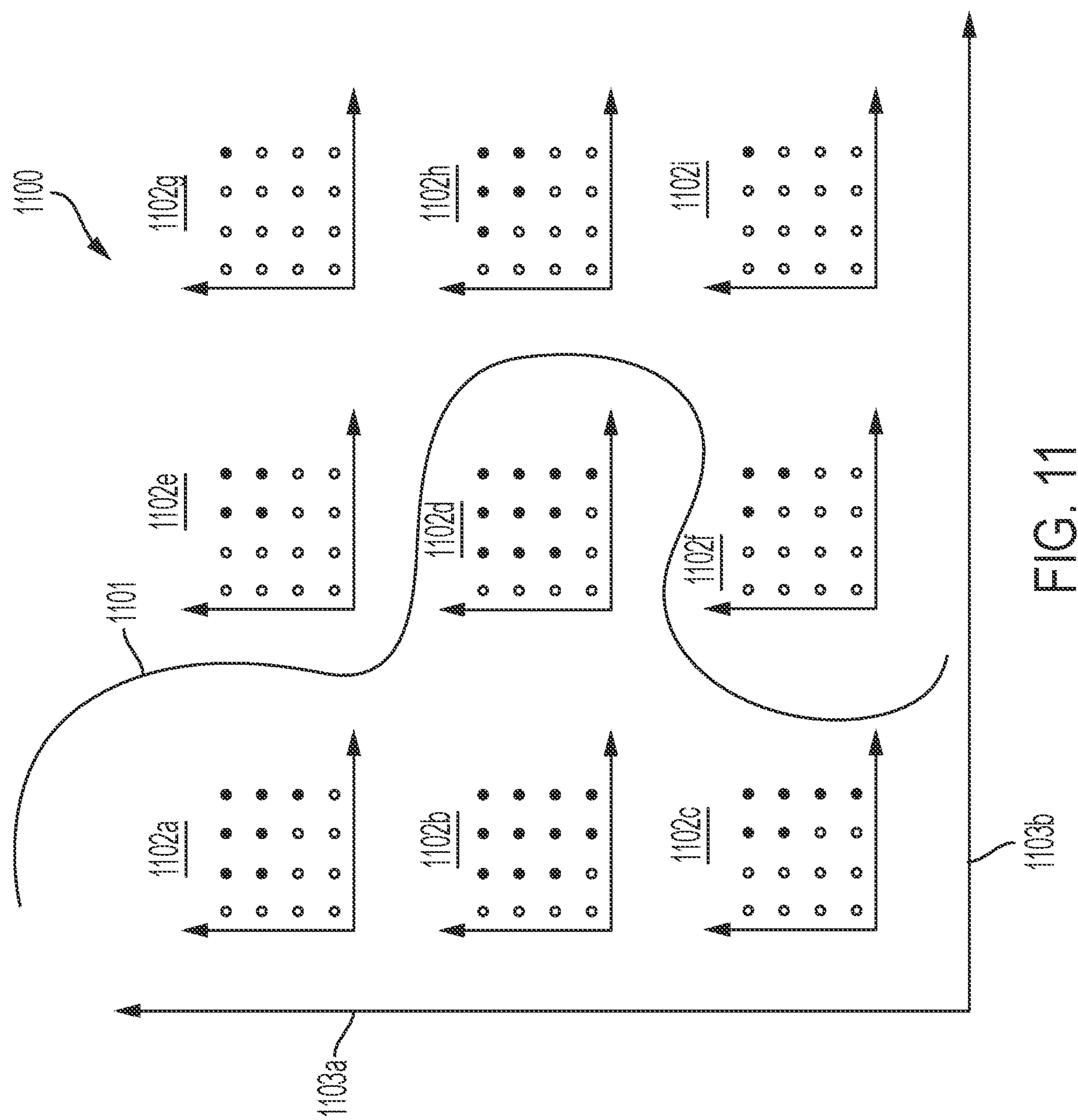
FIG. 11 illustrates an example generation of a global system boundary.

While the above disclosure describes creation of a system boundary for a single base scenario (i.e., the base scenario having a particular combination of variable parameters), it is not so limiting. For example, a global system boundary may be generated that divides a group of base scenarios based on, for example, whether the number of scenario variations per base scenario that are failing or passing is greater than a threshold, such as 50%. For example, as shown in the chart 1100 of FIG. 11, a global system boundary 1101 is generated by dividing the base scenarios 1102*a-n* based on the number of scenario variations in each base scenario that are successful or unsuccessful. The axes may indicate a value associated with each base scenario, such as the number of actors in each scenario, or the degree of visibility or available traction. For example, the X axis 1103*b* may plot base scenarios having 3, 5, and 7 actors, respectively, near the AV in an intersection in the scenario, and the Y axis 1103*a* may plot scenarios having decreasing levels of visibility. In another example, the X axis 1103*b* may plot scenarios having different classes of intersections (e.g., 3-way, 4-way, and 5-way), and the Y axis 1103*a* may plot the lane relationship between the AV and an actor near the AV in the intersection (e.g., crossing from left, crossing from right, going straight). As shown in FIG. 11, base scenarios 1102*a-d* have more than a threshold number (e.g., 6) of unsuccessful scenario variations while base scenarios 1102*e-i* have less than the threshold number of unsuccessful scenario variations. The boundary 1101 separates base scenarios having a threshold number of successful scenario variations from base scenario variations having less than the threshold of number of successful scenario variations.

The system may then generate additional base scenarios and/or scenario variations (1010) that may be relevant for testing and/or training. Because even minor variations in values which are close to the system boundary/global system boundary may present substantially different circumstances to the AV during training, increasing the number of scenario variations or base scenarios close to the system boundary/global system boundary may yield a rich and diverse set of simulation scenarios. This two-level approach allows for generation and selection of both base scenarios and corresponding scenario variations in critical areas.

For example, additional scenario variations may be generated for a base scenario by resampling data points in the parameter space for that base scenario from a region within a threshold distance of the system boundary generated for the base scenario. It should be noted that the new scenario variations may be on either side of the system boundary. This will create new scenario variations which when executed will test AV behavior closer to the system boundaries. The resampling may be performed using, for example, tools such as expected improvement algorithms, infill criteria for filling the parameter space close to the system boundary, or the like.

Figure 12:
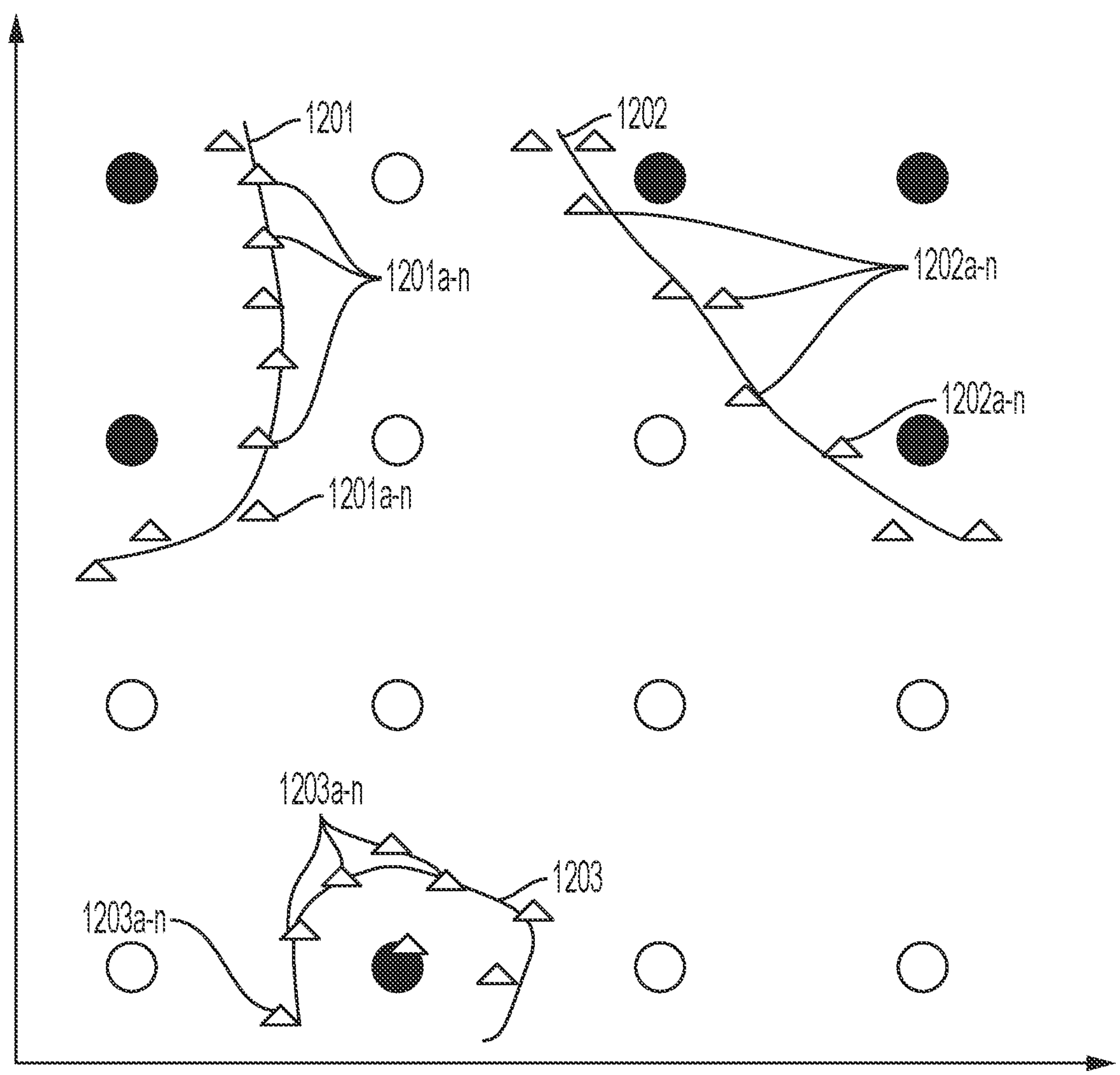
FIG. 12 illustrates an example method for generating new simulation variations near a system boundary.

The new generated scenario variations are added to the already existing scenario variations for execution in subsequent simulation runs. After adding the new scenario variations, the method may, optionally, include classifying the added scenario variations as successful or unsuccessful (either using the model of FIG. 7 and/or by actual execution of the scenario variation). This process can be iteratively repeated several times for improving execution of scenario variations along the system boundaries and for finding critical parameter sets. In some examples, the variations may be further refined by repeating the process of adding and removing scenario variations iteratively, thus refining the position of the system boundary for a base scenario at an iteratively finer level of granularity. The method may include executing a fixed number of iterations or iterating until a threshold level of granularity is reached. FIG. 12 illustrates new scenario variations 1201*a-n* generated (e.g., by sampling) near system boundary 1201, new scenario variations 1202*a-n* sampled near system boundary 1202, and new scenario variations 1203*a-n* sampled near system boundary 1203.

Similarly, additional base scenarios may be generated by resampling data points from a region within a threshold distance of the global system boundary in the design space. It should be noted that the new base scenarios may be on either side of the global system boundary.

Optionally, the methods may also include applying a minimum distance criterion to the scenario variations in parameter space to fill in sparsely populated portions of the parameter space. For example, when the distance between neighboring scenario variations is greater than a threshold distance, or the scenario density in a region of the parameter space is below a threshold density. When the minimum distance and/or density thresholds are not satisfied, the method may include generating additional scenario variations (e.g., using sampling discussed above) to fill in the parameter space. The threshold values may be determined by a user based on, for example, previous scenario designs and testing scenarios. For example, the method may apply a maximum distance criterion to the entire parameter space, e.g., determining a distance from every point in the parameter space to its nearest scenario variation and generating additional scenarios if the distance exceeds a threshold, thus avoiding large untested regions of the parameter space. The threshold may vary depending on the distance from the system boundary. For example, the required density of scenario variations may be higher close to the system boundary compared to regions far from the system boundary (the density may continuously decrease as the distance from the system boundary increases).

The above minimum distance criterion may similarly be applied at the base scenario level to add additional base scenarios in the design space.

The methods may then include removal of redundant simulation scenarios (1012) both at the base scenario level and the scenario variation level. The method may include removing simulations scenarios based on the distance from the boundary (system or global), distance from its nearest neighbors, classification of being successful or unsuccessful, or other criteria indicating that simulation scenario provides less relevant training/testing data. For example, the system may remove base scenarios that are within a threshold distance of each other in the design space. Similarly, the system may remove scenario variations that are within a threshold distance of each other in the parameter space of a base scenario. The threshold distance may vary depending upon the distance from the global system boundary in design space and/or the system boundary in parameter space for a base scenario. For example, in close proximity to the system boundary in parameter space of a base scenario, a smaller distance between scenario variations may be allowed compared to areas far away from the system boundary. Optionally, the method may also include retaining a threshold number of scenario variations on each "side" of the system boundary (or base scenarios with respect to the global system boundary). For example, the method may include keeping at least three scenario variations on each side of the system boundary even if the distance between neighboring scenario variations is less than the threshold value.

In various implementation, the method may include removal of redundant scenario variations and/or base scenarios until the total number of simulations is less than or equal to a limit based on available training resources, such as computing time. This results in a set of simulation scenarios that is diverse and useful, but also reasonably sized.

The method may then include ranking or prioritizing of simulation scenarios (1014)—both base scenarios and corresponding scenario variations—for subsequent simulation runs and/or triaging. For example, the scenario variations for a base scenario may be prioritized or ranked based on the system boundary for that base scenario (as discussed above). Similarly, the global system boundary may be used for ranking base scenarios such that base scenarios may be ranked based on their distance from the global system boundary. For example, base scenarios may closer to the global system boundary may be prioritized over or ranked higher than base scenarios that are further away from the global system boundary. Optionally, rankings of base scenarios and scenario variations may be combined such that scenario variations associated with higher ranked base scenarios may be prioritized over or ranked higher than scenario variations associated with lower ranked base scenarios.

At step 1016, the method includes selecting and executing a subset of the generated base scenarios and scenario variations in simulations. For example, the system may select, based on their corresponding rankings, base scenarios and associated scenario variations for execution for training and/or testing of an AV (e.g., AV stack).

To execute a simulation scenario, the system may simulate operations of the AV by applying the selected base scenarios and simulation variations to one or more of the AV systems to test or train the AV systems (e.g., motion planning systems) (e.g., using the software loop/hardware loop and/or the vehicle loop approaches discussed above). In some examples, the AV training system applies higher priority base scenarios and/or scenario variations more regularly than lower priority scenario variations or sets of scenario variations. For example, the highest priority sets of scenario variations may be applied daily, and lower priority sets of scenario variations may be applied weekly or biweekly. In some examples, the lowest ranking base scenarios/scenario variations are never used. The AV training system may continue to refine the prioritization or rank the base scenarios/scenario variations based on scenario execution results.

In various embodiments, the system may create a scenario data object for each generated base scenario. For example, a scenario data object may be a data structure or other data construct. Such a data object refers to a data representation of generated base scenario including information about the base scenario, variable parameters of the base scenario, ranking or prioritization compared to other base scenarios, parameter space and system boundary representation, or the like. The system may assign a unique identifier to the scenario data object. The unique identifier may be random or pseudo-randomly generated. Alternatively, the unique identifier may be sequentially or otherwise assigned by the system. The system may add a listing of the scenario variations corresponding to the base scenario to the data object. The listing may include, for example, an identifier associated with each scenario variation, the associated parameter values, associated ranking or priority, distance from the system boundary, and/or the like. In various embodiments, the system may store the scenario data object(s) in one or more data stores such that it is accessible by one or more simulation execution systems (e.g., simulator 510 of FIG. 5) for selection and execution of simulation scenarios. Optionally, a data object may be created for each scenario variation generated using the methods discussed above.

Base scenarios and scenario variations may be selected from the data store based on information included in the scenario data objects.

Step 1016 may be repeated for simulation execution until detection of a triggering event that requires regeneration of simulation scenarios (1018). A triggering event may include, for example, detection of change in a boundary (within a scenario variation and/or between base scenarios—i.e., system boundary and/or global boundary) that is greater than a threshold, a threshold amount of time since the last scenario generation, a user instruction, initiation of a scenario refresh cycle, an AV system change (e.g., to the AV stack) that requires new scenarios, or the like. The system may repeat steps 1002-1016 upon occurrence of the triggering event (1018: YES) yielding a new set of remaining base scenarios and/or scenario variations for future training and testing. A change in system boundary for a base scenario may be detected when a certain number scenario variations that were previously classified as unsuccessful become successful (e.g., as a result of improvements to the AV's motion system) or vice versa. Similarly, a change in global system boundary may be detected when a certain number base scenarios that were previously classified as having less than the threshold number of successful scenario variations change to having more than the threshold number of successful scenario variations (or vice versa).

Figure 13:
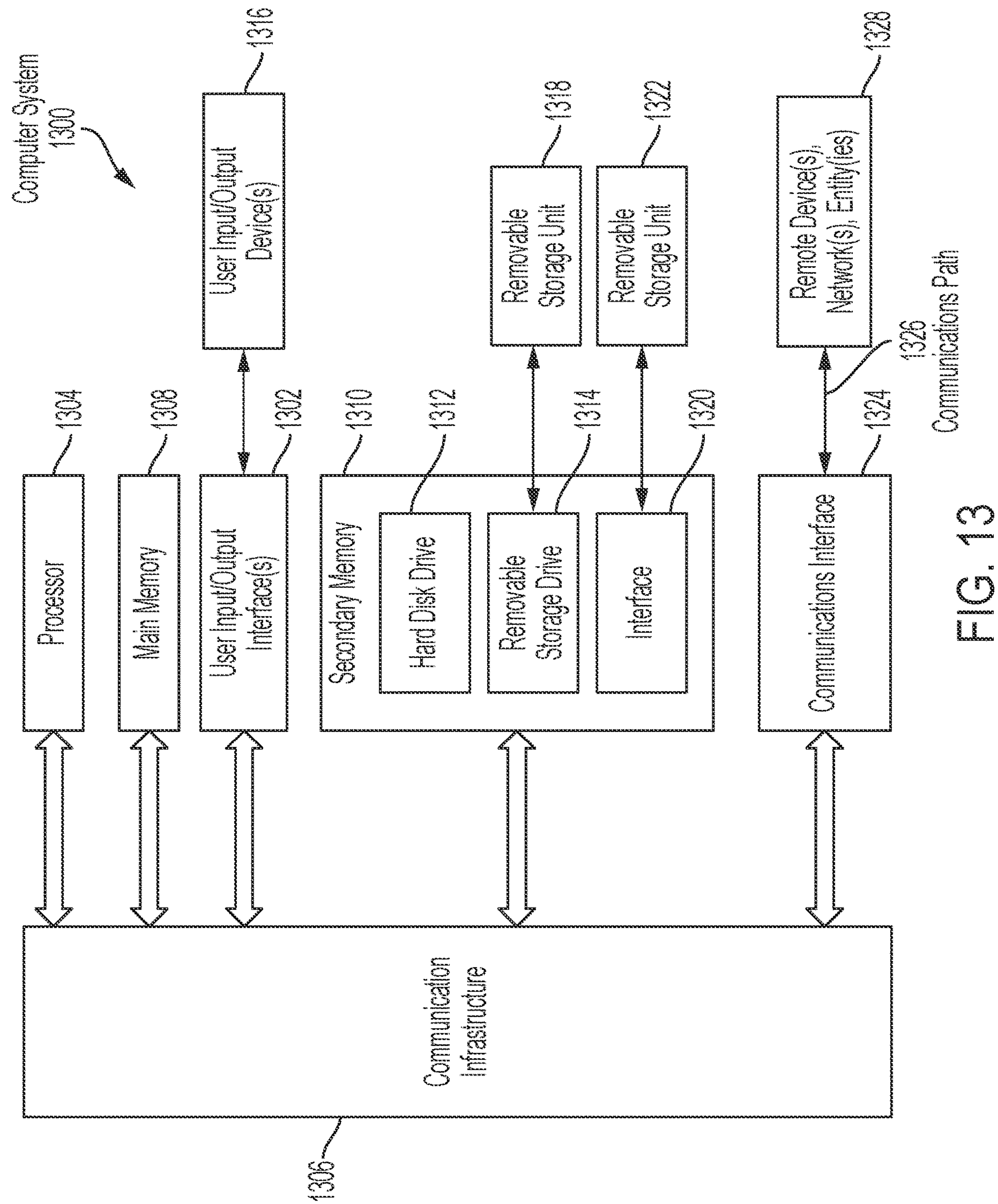
FIG. 13 is an example computer system useful for implementing various embodiments of this disclosure.

Various embodiments can be implemented, for example, using one or more computer systems, such as computer system 1300 shown in FIG. 13. Computer system 1300 can be any well-known computer capable of performing the functions described herein. Computer system 1300 includes one or more processors (also called central processing units, or CPUs), such as a processor 1304. Processor 1304 is connected to a communication infrastructure or bus 1306.

One or more processors 1304 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1300 also includes user input/output device(s) 1316, such as monitors, keyboards, pointing devices, etc., that communicate with communication infrastructure 1306 through user input/output interface(s) 1302.

Computer system 1300 also includes a main or primary memory 1308, such as random-access memory (RAM). Main memory 1308 may include one or more levels of cache. Main memory 1308 has stored therein control logic (i.e., computer software) and/or data.

Computer system 1300 may also include one or more secondary storage devices or memory 1310. Secondary memory 1310 may include, for example, a hard disk drive 1312 and/or a removable storage device or drive 1314. Removable storage drive 1314 may be a floppy disk drive, a magnetic tape drive, a compact disk drive, an optical storage device, tape backup device, and/or any other storage device/drive.

Removable storage drive 1314 may interact with a removable storage unit 1318. Removable storage unit 1318 includes a computer usable or readable storage device having stored thereon computer software (control logic) and/or data. Removable storage unit 1318 may be a floppy disk, magnetic tape, compact disk, DVD, optical storage disk, and/any other computer data storage device. Removable storage drive 1314 reads from and/or writes to removable storage unit 1318 in a well-known manner.

According to an example embodiment, secondary memory 1310 may include other means, instrumentalities, or other approaches for allowing computer programs and/or other instructions and/or data to be accessed by computer system 1300. Such means, instrumentalities or other approaches may include, for example, a removable storage unit 1322 and an interface 1320. Examples of the removable storage unit 1322 and the interface 1320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1300 may further include a communication or network interface 1324. Communication interface 1324 enables computer system 1300 to communicate and interact with any combination of remote devices, remote networks, remote entities, etc. (individually and collectively referenced by reference number 1328). For example, communication interface 1324 may allow computer system 1300 to communicate with remote devices 1328 over communications path 1326, which may be wired and/or wireless, and which may include any combination of LANs, WANs, the Internet, etc. Control logic and/or data may be transmitted to and from computer system 1300 via communication path 1326.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 1300, main memory 1308, secondary memory 1310, and removable storage units 1318 and 1322, as well as tangible articles of manufacture embodying any combination of the foregoing. Such control logic, when executed by one or more data processing devices (such as computer system 1300), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 13. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

Terminology that is relevant to the disclosure provided above includes:

An "automated device" or "robotic device" refers to an electronic device that includes a processor, programming instructions, and one or more physical hardware components that, in response to commands from the processor, can move with minimal or no human intervention. Through such movement, a robotic device may perform one or more automatic functions or function sets. Examples of such operations, functions or tasks may include, without limitation, operating wheels or propellers to effectuate driving, flying or other transportation actions, operating robotic lifts for loading, unloading, medical-related processes, construction-related processes, and/or the like. Example robotic devices may include, without limitation, AVs, drones and other autonomous robotic devices.

The term "vehicle" refers to any moving form of conveyance that is capable of carrying either one or more human occupants and/or cargo and is powered by any form of energy. The term "vehicle" includes, but is not limited to, cars, trucks, vans, trains, AVs, aircraft, aerial drones and the like. An "AV" is a vehicle having a processor, programming instructions and drivetrain components that are controllable by the processor without requiring a human operator. An AV may be fully autonomous in that it does not require a human operator for most or all driving conditions and functions. Alternatively, it may be semi-autonomous in that a human operator may be required in certain conditions or for certain operations, or that a human operator may override the vehicle's autonomous system and may take control of the vehicle. AVs also include vehicles in which autonomous systems augment human operation of the vehicle, such as vehicles with driver-assisted steering, speed control, braking, parking and other advanced driver assistance systems.

The term "object," when referring to an object that is detected by a vehicle perception system or simulated by a simulation system, is intended to encompass both stationary objects and moving (or potentially moving) actors, except where specifically stated otherwise by use of the term "actor" or "stationary object."

When used in the context of AV motion planning, the term "trajectory" refers to the plan that the vehicle's motion planning system will generate, and which the vehicle's motion control system will follow when controlling the vehicle's motion. A trajectory includes the vehicle's planned position and orientation at multiple points in time over a time horizon, as well as the vehicle's planned steering wheel angle and angle rate over the same time horizon. An AV's motion control system will consume the trajectory and send commands to the vehicle's steering controller, brake controller, throttle controller and/or other motion control subsystem to move the vehicle along a planned path.

A "trajectory" of an actor that a vehicle's perception or prediction systems may generate refers to the predicted path that the actor will follow over a time horizon, along with the predicted speed of the actor and/or position of the actor along the path at various points along the time horizon.

In this document, the terms "street," "lane," "road" and "intersection" are illustrated by way of example with vehicles traveling on one or more roads. However, the embodiments are intended to include lanes and intersections in other locations, such as parking areas. In addition, for AVs that are designed to be used indoors (such as automated picking devices in warehouses), a street may be a corridor of the warehouse and a lane may be a portion of the corridor. If the AV is a drone or other aircraft, the term "street" or "road" may represent an airway and a lane may be a portion of the airway. If the AV is a watercraft, then the term "street" or "road" may represent a waterway and a lane may be a portion of the waterway.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

The terms "processor" and "processing device" refer to a hardware component of an electronic device that is configured to execute programming instructions, such as a microprocessor or other logical circuit. A processor and memory may be elements of a microcontroller, custom configurable integrated circuit, programmable system-on-a-chip, or other electronic device that can be programmed to perform various functions. Except where specifically stated otherwise, the singular term "processor" or "processing device" is intended to include both single-processing device embodiments and embodiments in which multiple processing devices together or collectively perform a process.

A "machine learning model" or a "model" refers to a set of algorithmic routines and parameters that can predict an output(s) of a real-world process (e.g., prediction of an object trajectory, a diagnosis or treatment of a patient, a suitable recommendation based on a user search query, etc.) based on a set of input features, without being explicitly programmed. A structure of the software routines (e.g., number of subroutines and relation between them) and/or the values of the parameters can be determined in a training process, which can use actual results of the real-world process that is being modeled. Such systems or models are understood to be necessarily rooted in computer technology, and in fact, cannot be implemented or even exist in the absence of computing technology. While machine learning systems utilize various types of statistical analyses, machine learning systems are distinguished from statistical analyses by virtue of the ability to learn without explicit programming and being rooted in computer technology.

In this document, when relative terms of order such as "first" and "second" are used to modify a noun, such use is simply intended to distinguish one item from another, and is not intended to require a sequential order unless specifically stated.

In addition, terms of relative position such as "front" and "rear", or "ahead" and "behind", when used, are intended to be relative to each other and need not be absolute, and only refer to one possible position of the device associated with those terms depending on the device's orientation.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents.

What is claimed is:

1. A method for providing a computer simulation of an autonomous vehicle, comprising:

generating, by a computing device, a plurality of base scenarios, each of the plurality of base scenarios is executable by a simulator and comprises one or more constant parameters and one or more variable parameters defining a configuration of a simulation scenario that is an artificial representation of a real-world occurrence for the autonomous vehicle, wherein the one or more variable parameters comprises a parameter value for a circuit element of the autonomous vehicle;

for each of the plurality of base scenarios, performing the following operations by the computing device:

generating a plurality of scenario variations for each base scenario of the plurality of base scenarios, each said scenario variation specifying a simulation scene created using a unique combination of values assigned to that base scenario's one or more variable parameters, defining a system boundary line in a parameter space for said base scenario that is defined by all possible values of the base scenario's one or more variable parameters, wherein the system boundary line divides the parameter space into a first region including successful scenario variations and a second region including unsuccessful scenario variations, and generating additional scenario variations by resampling data points in the parameter space from a region within a threshold distance of the system boundary line and residing on a particular side of the system boundary line; and computer simulating, by the simulator, operation of the autonomous vehicle in different conditions and environments by applying a plurality of scenarios to an autonomous vehicle system model, the plurality of scenarios comprising a subset of the plurality of base scenarios and one or more generated scenario variations.

2. The method of claim 1, further comprising generating a global system boundary in a design space, wherein the global system boundary divides the design space into a first region including base scenarios having more than a threshold number of successful scenario variations and a second region including base scenarios having fewer than a threshold number of successful scenario variations.

3. The method of claim 2, further comprising generating additional base scenarios within a threshold distance of the global system boundary.

4. The method of claim 3, further comprising prioritizing the plurality of base scenarios and the additional base scenarios based on a distance of each of the plurality of base scenarios and each of the additional base scenarios from the global system boundary.

5. The method of claim 2, further comprising removing a first base scenario as redundant when the first base scenario is determined to be within a threshold distance of a second base scenario in the design space, the threshold being determined based on a distance from the global system boundary.

6. The method of claim 2, wherein generating the base scenarios comprises generating base scenarios to include parameters that are uniformly sampled from the design space.

7. The method of claim 1, further comprising, for each of the plurality of base scenarios, prioritizing the plurality of scenario variations for that base scenario and the additional scenario variations based on a distance of each of the plurality of scenario variations and each of the additional scenario variations from the system boundary.

8. The method of claim 7, wherein simulating the operation of the AV using the plurality of scenarios comprises selecting, based on the prioritizing of the plurality of base scenarios and the prioritizing of the plurality of scenario variations, the subset of the plurality of base scenarios and a subset of scenario variations associated with each of the base scenarios in the plurality of base scenarios.

9. The method of claim 1, further comprising removing a first scenario variation as redundant when the first scenario variation is determined to be within a threshold distance of a second scenario variation in the parameter space, the threshold being determined based on a distance from the system boundary.

10. The method of claim 1, further comprising storing each base scenario and corresponding scenario variations as a scenario data object in a data store.

11. The method of claim 1, further comprising detecting a triggering event indictive of whether or not new scenarios need to be generated, the triggering event selected from at least one of the following: detection of change in a system boundary that is greater than a threshold, detection of change in a global system boundary that is greater than a threshold, a threshold amount of time since a previous scenario generation, receipt of a user instruction, initiation of a scenario refresh cycle, or an AV system change that requires new scenario generation.

12. The vehicle motion planning model training system of claim 1, wherein the programming instructions are further configured to cause the processor to train the vehicle motion planning model by prioritizing the plurality of base scenarios and the additional base scenarios based on a distance of each of the plurality of base scenarios and each of the additional base scenarios from the global system boundary.

13. A vehicle motion planning model training system, comprising:

a processor;

a data store containing a plurality of simulation scenarios; and a memory that stores programming instructions that are configured to cause the processor to train a vehicle motion planning model by:

generating a plurality of base scenarios, each of the plurality of base scenarios is executable by a simulator and comprises one or more constant parameters and one or more variable parameters, defining a configuration of a simulation scenario that is an artificial representation of a real-world occurrence for an autonomous vehicle, wherein the one or more variable parameters comprises a parameter value for a circuit element of the autonomous vehicle;

for each of the plurality of base scenarios:

generating a plurality of scenario variations for each base scenario of the plurality of base scenarios, each said scenario variation specifying a simulation scene created using a unique combination of values assigned to that base scenario's one or more variable parameters, defining a system boundary line in a parameter space for said base scenario that is defined by all possible values of the base scenario's one or more variable parameters, wherein the system boundary line divides the parameter space into a first region including successful scenario variations and a second region including unsuccessful scenario variations, and generating additional scenario variations by resampling data points in the parameter space from a region within a threshold distance of the system boundary line and residing on a particular side of the system boundary line; and computer simulating operation of the autonomous vehicle (AV) in different conditional and environments by applying a plurality of scenarios to the vehicle motion planning model, the plurality of scenarios comprising a subset of the plurality of base scenarios and one or more generated scenario variations.

14. The vehicle motion planning model training system of claim 13, wherein the programming instructions are further configured to cause the processor to train the vehicle motion planning model by generating a global system boundary in a design space, wherein the global system boundary divides the design space into a first region including base scenarios having more than a threshold number of successful scenario variations and a second region including base scenarios having fewer than a threshold number of successful scenario variations.

15. The vehicle motion planning model training system of claim 14, wherein the programming instructions are further configured to cause the processor to train the vehicle motion planning model by generating additional base scenarios within a threshold distance of the global system boundary.

16. A computer program product comprising:

a memory that stores programming instructions that are configured to cause a processor to train a vehicle motion planning model by:

generating a plurality of base scenarios, each of the plurality of base scenarios is executable by a simulator and comprises one or more constant parameters and one or more variable parameters defining a configuration of a simulation scenario that is an artificial representation of a real-world occurrence for the autonomous vehicle, wherein the one or more variable parameters comprises a parameter value for a circuit element of the autonomous vehicle;

for each of the plurality of base scenarios:

generating a plurality of scenario variations for each base scenario of the plurality of base scenarios, each said scenario variation specifying a simulation scene created using a unique combination of values assigned to that base scenario's one or more variable parameters, defining a system boundary line in a parameter space for said base scenario that is defined by all possible values of the base scenario's one or more variable parameters, wherein the system boundary line divides the parameter space into a first region including successful scenario variations and a second region including unsuccessful scenario variations, and generating additional scenario variations by resampling data points in the parameter space from a region within a threshold distance of the system boundary line and residing on a particular side of the system boundary line; and computer simulating operation of the autonomous vehicle in different conditions and environments by applying a plurality of scenarios to the vehicle motion planning model, the plurality of scenarios comprising a subset of the plurality of base scenarios and one or more generated scenario variations.

17. The computer program product of claim 16, wherein the programming instructions are further configured to cause the processor to train the vehicle motion planning model by generating a global system boundary in a design space, wherein the global system boundary divides the design space into a first region including base scenarios having more than a threshold number of successful scenario variations and a second region including base scenarios having fewer than a threshold number of successful scenario variations.

18. The computer program product of claim 17, wherein the programming instructions are further configured to cause the processor to train the vehicle motion planning model by generating additional base scenarios within a threshold distance of the global system boundary.

19. The computer program product of claim 18, wherein the programming instructions are further configured to cause the processor to train the vehicle motion planning model by prioritizing the plurality of base scenarios and the additional base scenarios based on a distance of each of the plurality of base scenarios and each of the additional base scenarios from the global system boundary.

20. The computer program product of claim 16, wherein the programming instructions are further configured to cause the processor to train the vehicle motion planning model by, for each of the plurality of base scenarios, prioritizing the plurality of scenario variations for that base scenario and the additional scenario variations based on a distance of each of the plurality of scenario variations and each of the additional scenario variations from the system boundary.

* * * * *